United States Patent
Brenner et al.

(10) Patent No.: US 11,037,258 B2
(45) Date of Patent: Jun. 15, 2021

(54) MEDIA CONTENT PROCESSING TECHNIQUES USING FINGERPRINTING AND HEURISTICS

(71) Applicant: Dubset Media Holdings, Inc., San Francisco, CA (US)

(72) Inventors: Vadim Brenner, San Francisco, CA (US); Stephen White, San Francisco, CA (US); Ryan Wigley, Brooklyn, NY (US); Mijat Nenezic, Miami Beach, FL (US); Jay Juilin Hung, San Francisco, CA (US)

(*) Notice: Subject to any disclaimer, the term of this patent is extended or adjusted under 35 U.S.C. 154(b) by 192 days.

(21) Appl. No.: 16/288,857

(22) Filed: Feb. 28, 2019

(65) Prior Publication Data

US 2019/0272834 A1 Sep. 5, 2019

Related U.S. Application Data

(60) Provisional application No. 62/637,570, filed on Mar. 2, 2018.

(51) Int. Cl.
| | |
|---|---|
| *G06F 17/00* | (2019.01) |
| *G06Q 50/18* | (2012.01) |
| *G10L 19/018* | (2013.01) |
| *G10L 25/51* | (2013.01) |
| *G06F 40/30* | (2020.01) |
| *G10L 15/10* | (2006.01) |
| *G10L 15/02* | (2006.01) |

(52) U.S. Cl.
CPC ........... *G06Q 50/184* (2013.01); *G06F 40/30* (2020.01); *G10L 19/018* (2013.01); *G10L 25/51* (2013.01); *G10L 15/10* (2013.01); *G10L 2015/025* (2013.01)

(58) Field of Classification Search
CPC ..... G06F 21/10; G06F 16/685; H04N 21/233; H04N 21/8352
See application file for complete search history.

(56) References Cited

U.S. PATENT DOCUMENTS

| | | | | |
|---|---|---|---|---|
| 7,085,613 | B2* | 8/2006 | Pitman | G06Q 30/0283 700/94 |
| 8,799,170 | B2* | 8/2014 | Mallardo | G06F 21/10 705/59 |
| 9,652,600 | B2* | 5/2017 | Cockcroft | G06F 21/10 |
| 10,037,750 | B2* | 7/2018 | Brooker | G10H 1/0008 |
| 2003/0229537 | A1* | 12/2003 | Dunning | G06F 16/337 705/26.7 |

(Continued)

*Primary Examiner* — Joseph Saunders, Jr.
(74) *Attorney, Agent, or Firm* — Hogan Lovells US LLP

(57) ABSTRACT

Systems and methods in accordance with various embodiments of the present disclosure provide improved techniques to process and identify segments of media content and associated intellectual property rights associated with the media content. Intellectual property rights associated with media content may include copyright, trademarks, licenses to composition, synchronization, performance, recordings, etc. In particular, various embodiments provide improved techniques to identify segments of media content using fingerprinting and/or other heuristic rules to identify the original source of the segments of media content, the rights holders, and/or rights associated with the segments of media content.

20 Claims, 12 Drawing Sheets

(56) References Cited

U.S. PATENT DOCUMENTS

| | | | |
|---|---|---|---|
| 2005/0249075 A1* | 11/2005 | Laronne | G11B 27/24 369/47.53 |
| 2007/0083558 A1* | 4/2007 | Martinez | G06Q 30/02 |
| 2007/0083762 A1* | 4/2007 | Martinez | G06F 16/434 713/176 |
| 2007/0094139 A1* | 4/2007 | Martinez | G06Q 20/1235 705/40 |
| 2007/0106405 A1* | 5/2007 | Cook | G06F 16/683 700/94 |
| 2008/0114665 A1* | 5/2008 | Teegarden | G06Q 10/101 705/300 |
| 2008/0154730 A1* | 6/2008 | Schmelzer | G06F 21/10 705/14.53 |
| 2008/0208851 A1* | 8/2008 | Briggs | H04H 20/14 |
| 2008/0221942 A1* | 9/2008 | Agnihotri | G11B 27/322 705/7.33 |
| 2008/0240490 A1* | 10/2008 | Finkelstein | H04N 21/23892 382/100 |
| 2008/0288629 A1* | 11/2008 | Fisher, III | G06Q 30/02 709/224 |
| 2009/0063277 A1* | 3/2009 | Bernosky | G06F 16/748 705/14.73 |
| 2009/0158155 A1* | 6/2009 | Quinn | G11B 19/022 715/716 |
| 2009/0328228 A1* | 12/2009 | Schnell | G06F 21/10 726/26 |
| 2010/0131558 A1* | 5/2010 | Logan | G06Q 50/184 707/783 |
| 2011/0015968 A1* | 1/2011 | Carlson | G06Q 50/184 705/310 |
| 2011/0161409 A1* | 6/2011 | Nair | G06F 8/38 709/203 |
| 2012/0303663 A1* | 11/2012 | Asikainen | G06F 16/3347 707/780 |
| 2012/0323800 A1* | 12/2012 | Stein | G06Q 20/1235 705/310 |
| 2013/0305385 A1* | 11/2013 | Korteweg | G06F 21/10 726/27 |
| 2014/0052284 A1* | 2/2014 | DeBusk | G06K 9/00523 700/94 |
| 2015/0074748 A1* | 3/2015 | Brock | G06F 21/105 726/1 |
| 2016/0188981 A1* | 6/2016 | Doerring | G06F 16/7834 382/190 |
| 2017/0323088 A1* | 11/2017 | Estes | G06F 16/22 |
| 2018/0047399 A1* | 2/2018 | Candebat | G10L 19/018 |
| 2018/0285455 A1* | 10/2018 | DiMaria | G06F 16/61 |

* cited by examiner

MEDIA CONTENT PROCESSING TECHNIQUES USING FINGERPRINTING AND HEURISTICS

CROSS REFERENCE TO RELATED APPLICATIONS

This U.S. Non-provisional patent applications claims priority to and benefit of U.S. Provisional Patent Application No. 62/637,570 filed Mar. 2, 2018, which is hereby incorporated by reference herein in its entirety.

BACKGROUND

Advancements in technology are constantly influencing and evolving the music and media content industry, not only in how it may be distributed and stored, but also how it may be created. While traditional instruments may produce analog music that may then be recorded, converted to a digital format to be stored and distributed electronically, music may now also be created digitally from its conception. Many users compile and mix various music samples digitally for distribution as their own music, which may raise a problem in identifying music samples and the associated rights holders to determine the appropriate licensing rights associated with the music samples used in mixes. With the convenience and ease of portable digital music players, smart phones, cloud computing, and seemingly infinite digital libraries of music, there may be an increased need in the industry to identify media content samples used to create new works of media content, such that in the distribution of the new media content, the associated rights of the rights holders of media content samples may be preserved.

BRIEF DESCRIPTION OF THE DRAWINGS

Various embodiments in accordance with the present disclosure will be described with reference to the drawings, in which.

DETAILED DESCRIPTION

Figure 1:
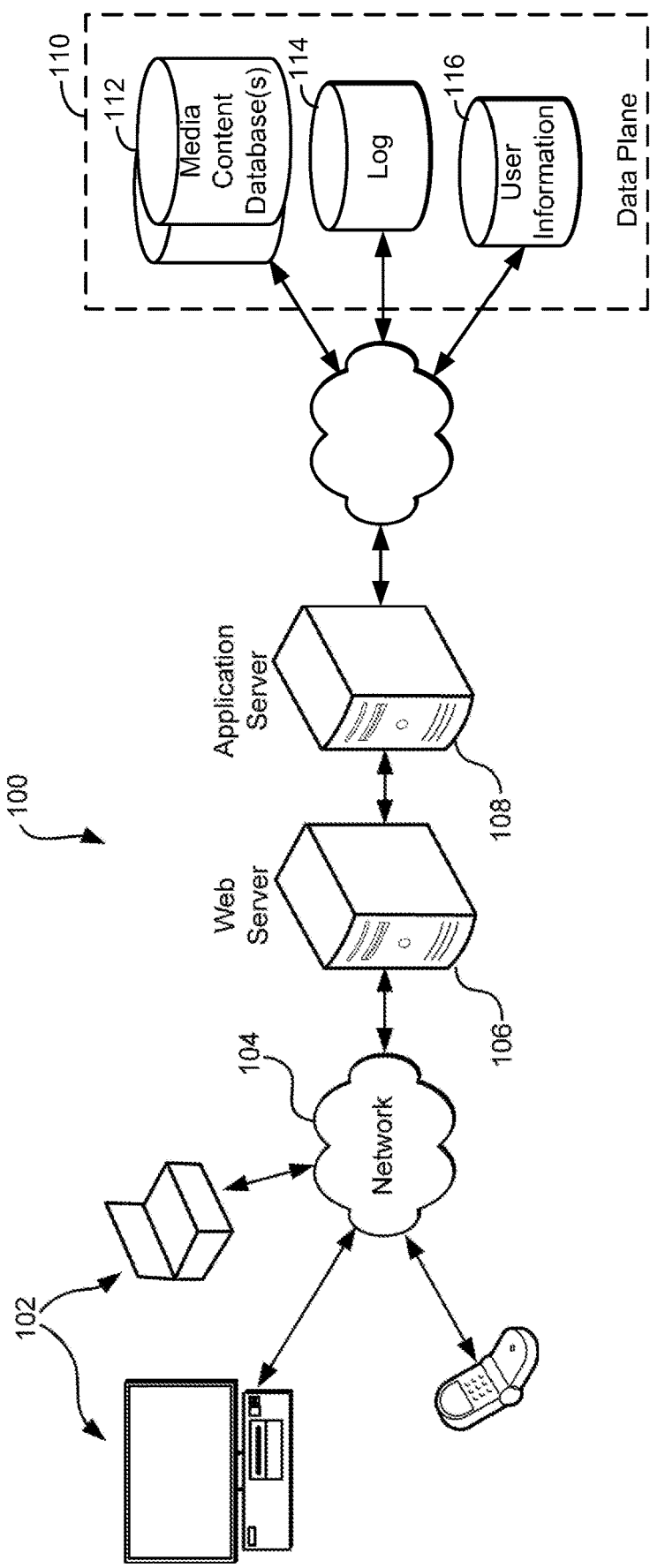
FIG. 1 illustrates an environment in which various embodiments may be implemented.

Systems and methods in accordance with various embodiments of the present disclosure may overcome one or more of the aforementioned and other deficiencies experienced in conventional approaches to distribute media content digitally and manage associated intellectual property rights in a secure, immutable, efficient, and automatic manner. Intellectual property rights associated with media content may include copyright, trademarks, licenses to composition, synchronization, performance, recordings, etc. In particular, various embodiments provide improved techniques to identify segments of media content in order to determine the associated rights holders of the segments of media content.

Music creation has undergone exponential growth giving rise to a new wave of creators, musicians, remixers, and curators. In the last 80 years, the music industry has recorded and registered 5 million hours of new music. In comparison, every two months, the DJ community creates 5 million hours of new recorded music. The DJ community consists of musicians and individual users or consumers, and their music generally involves sampling, mixing, modifying, and compiling snippets of other music created by other artists. The music created by the DJ community may be referred to as user generated content (UGC). With the advent of the internet and digital media processing, UGC has exploded because users may now easily create their own music and videos. Currently, the music industry uploads about 20,000 tracks of recorded and registered music per day on Spotify™, compared to 260,000 tracks of UGC music uploaded by DJ community on SoundCloud™ and 2,600,000 tracks of UG music uploaded by DJ community on YouTube™. Outside of YouTube™, music services are not equipped to properly handle UGC.

The technical problems in handling UGC include first the identification of sampled music in UGC, for example, in determining what master recording and master compositions are being sampled within the UGC music. Second, once the music sampled has been identified, then the multiple rights holders and their corresponding associated rights may be notified in advance of distribution. DJ mix/remix content may fall into two categories, a) single-track, and b) multi-track (two or more original tracks). In both cases they are considered derivative works. The creation of these derivative works may be based on modification of original copyrighted content, created by the original artist(s), which may be associated with an additional set of rights holders that may include labels, publishers, featured artists, etc.

Today, there may be no system to analyze derivative works, identify, track, report, and ultimately ensure that rights holders are being recognized and potentially paid for use of their copyrighted recordings and compositions. Another challenge may be that current delivery models for consumer-based digital music streaming services are predicated on playback and lengths of individual single-track songs. Therefore, traditional royalty programs and fee schedules are based on playing individual full length songs. They are not applicable to multi-track derivative music that may combine two or more song segments and where a derivative work may exceed one hour in duration. Furthermore, there may be no system today that allows music services to seamlessly offer new programs for the rights holders and content creators to seamlessly accept or decline with a mouse-click distribution of derivative works with their content. These challenges and voids prevent a sustainable ecosystem from forming and hinder an exchange or marketplace where content creators may legally distribute derivative works to content distributors. Embodiments of the present invention provide the digital media processing technology, rights management database, and user-friendly interfaces to allow users to create new mix and remix distribution and monetization opportunities built on transparency, ownership control, and simplicity.

FIG. 1 illustrates an example of an environment 100 for implementing aspects in accordance with various embodiments. Although a Web-based environment may be used for purposes of explanation, different environments may be used, as appropriate, to implement various embodiments. An electronic client device 102 may include any appropriate device operable to send and receive requests, messages, or information over an appropriate network 104 and convey information back to a user of the device; personal computers, cell phones, portable music players, tablets, laptops, electronic book readers, etc. The network may include any appropriate network, including an intranet, the Internet, a cellular network, a local area network, or any other such network or combination thereof. Protocols and components for communicating via such a network may be enabled by wired or wireless connections, and combinations thereof. In this example, the network includes the Internet, as the environment includes a Web server 106 for receiving requests and serving content in response to the requests, although for other networks and other devices could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110. Resources of this plane are not limited to storing and providing access to data, but there may be several application servers, layers, or other elements, processes, or components, which may be linked or otherwise configured, to interact and perform tasks such as obtaining data from an appropriate data store. The term "data store" refers to any device or combination of devices capable of storing, accessing, and retrieving data, which may include any combination and number of data servers, databases, data storage devices, and data storage media, in any standard, distributed, or clustered environment. The application server provides admission control services in cooperation with the data store, and may be able to generate content such as text, graphics, audio, photos and/or video to be transferred to the user (an individual or $3^{rd}$ party servers, platforms, applications and devices), which may be served to the user by the Web server in the form of HTML, XML, or another appropriate structured language in this example. In some embodiments, the Web server 106, application server 108 and similar components may be part of the data plane. The handling of all requests and responses, as well as the delivery of content between the client device 102 and the application server 108, may be handled by the Web server.

The data stores of the data plane 110 may include several separate data tables, databases, blocks, blockchains, or other data storage mechanisms for storing data relating to processing media content and managing licensing rights associated with the media content. For example, the data plane illustrated includes mechanisms for storing media content data, such as media content database(s) 112 and user information 116, which may be used to receive, process, store, clear and distribute media content. The data plane also may be shown to include a mechanism for storing log data 114, which may be used for purposes such as reporting, analysis, and determining chain of custody for media content. It should be understood that there may be many other aspects that may need to be stored in a data store, such as for access, usage and distribution rights information, which may be stored in any of the above listed mechanisms as appropriate or in additional mechanisms in the data plane 110. The data plane 110 may be operable, through logic associated therewith, to receive instructions from the application server 108 and obtain, update, or otherwise process data, instructions, or other such information in response thereto. In one example, a user might upload UGC. In this case, components of the data plane might access the user information to verify the identity of the user, process the UGC, and access the media content catalog detail information to obtain information about the UGC and determine associated licensing rights with the media content identified in the UGC. The information then may be returned to the user, such as in a results listing on a Web page that the user may be able to view via a browser on the user device 102, showing the identified media content in the UGC, the rights holders of the media content, and licensing information associated with the media content. Information for the media content of interest may be viewed in a dedicated page or window of the browser, or a report generated in various other formats that are readable by a user.

The environment in one embodiment may be a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

In some embodiments, a media content processing system may include a centralized registry that contains the digital assets, such as the licensing rights, along with associated metadata. Advanced content identification technologies may be implemented to unravel the complexities of derivative works of media content whose rights holders have been identified. Local licensing nodes may enable individual rights holders to access data and establish rules. The media content processing system may provide a global exchange that networks and connects all nodes together enabling cross-rights holder content licensing and clearance. Rights holders and content creators may manage their mix and remix catalogs efficiently across music services. In some embodiments, the media content processing system may also include a marketplace providing media service providers and rights holders a seamless one-click approach to program approvals and the required catalog licensing. Rights holders may be able to choose where their content may be distributed and how they generate revenue through digital assets, such as composition rights, recording rights, performance rights, synchronization rights, etc. The media content processing system allows rights holders to be in control of where media content may be distributed, while allowing media service providers to offer pricing models and revenue splits that suit their business.

According to embodiments of the present application, the media content processing system may create an offer, for example, a media content service provider may offer per stream or revenue share pricing models directly to rights holders. Subsequently, the rights holders may review offers. Rights holders may be able to review the program details, including revenue splits, territory splits, and guaranteed minimums. After reviewing the offers, the rights holders may choose to accept offers. Rights holders accept the pricing models that work best for them and content may be distributed.

An environment such as that illustrated in FIG. 1 may be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions.

According to various embodiments, the media content processing system may include a media content database and a media content processing module. In another embodiment, the media content database and media content processing module may be separate independent entities; for example the media content database may be independently operated from, but in communication with, the media content processing system. Identifying segments of media content may involve several processes and consider several factors.

A segment of media content, such as a song segment, may include the portion of a song that was used within a user's uploaded media content, for example, a DJ mix. When using songs in a mix, DJs may exclude the beginning and end portions of the song. The result may be a derivative work composed of these song segments. Another factor that may be considered may be the length or duration of the segment used. For example, a song segment's duration may be the total time a song segment may be used in a DJ mix. In some embodiments, the song segment duration may include the time during a transition from one song segment into the next.

Additionally, the media content, such as music, may have different versions or releases. As such, it may be not only important for the media content processing system to identify the song (e.g., title, artist, etc.) but the release or version, in order to determine the appropriate rights holder. Release duration may refer to the total duration of a song as it may be found in the original licensed release (e.g., in an album or single release). The media content processing system may implement a fingerprinting service according to various embodiments. The fingerprinting service and textual data supplied by the DJ within the tracklist provides this information. For example, a DJ may use Song A for 02:31 during a mix, but Song A's release duration may be 03:42. The song segment duration may be 01:11 shorter.

Release start time may include the time stamp within the original licensed release where a song segment may be playing within a DJ mix. For example, a DJ may initiate playing Song A at the 00:32 mark, as opposed to initiating playback at the beginning of Song A as in traditional single-track audio.

To identify music segments, the media content processing system may implement a fingerprinting process. Fingerprinting may be used to analyze the acoustic characteristics of the audio in mixes and remixes. The fingerprint may be compared to reference fingerprints that are typically stored in a master database and are associated with the respective music metadata/songs. This metadata and the associated fingerprints database may reside in the cloud or in a non-connected platform such as a DJ mixer. Whether two fingerprints match may be decided by measuring the distance between the two fingerprints. The tolerance for what may be deemed a successful match and confidence may be predetermined by the fingerprint algorithm. The confidence and the distance are internal measures used by fingerprint algorithms and are not displayed or outputted externally. A successful match may result in one exact match to a single song or many multiple possible matches to a set of songs. The number of possible matches may vary depending on how close the fingerprint of the unknown song that may be being identified may be to the reference fingerprint(s).

While fingerprinting technology may provide a list of all the possible candidates, there are still challenges in accuracy of determining who the rights holders are; for example, when applying fingerprinting technology to music derivative works like DJ mixes and remixes. There are a number of challenges in attaining a high level of confidence to ensure the right match may be made in identifying the rights holders for associated media content. As an example, DJ mixes and remixes present challenges because songs may be played simultaneously and overlap, DJs may speed up or slow down songs, DJs may also add other sounds (e.g., such as special effects) into the song to alter it, or they may talk over the song. Such changes to the derivative work are substantial enough where the original content cannot be identified with high confidence, or cannot be identified at all, using fingerprinting technology. In some cases it could be tens of hundreds of possible matches. The resulting matches may have lower confidence, which produce no matches or wrong matches in the worst case. For these reasons, existing fingerprint technology solutions encounter technical problems in identifying derivative works, such as DJ mixes and remixes. Instead, a specialized method and system are needed to process the possible results that are based on fingerprint technology.

Furthermore, music inherently presents a number of other challenges, simply in the way it may be created and marketed by the artists and the labels. Identical tracks may be released on multiple albums (e.g., Original Release, Release with Bonus Tracks, Best Of, The Greatest Hits, Soundtracks, Remastered, etc.). This presents challenges in identifying the correct original song. The latter presents issues in ensuring the correct rights holders are paid. For example, while the artist and the publisher would remain the same, an album that may be a soundtrack of a movie may be created by a label who may be different than the one for the original release. Or, an artist may have changed labels and rereleased an album under a different label. Or, an artist might be covering the original work of another artist and re-releasing it.

For example, music may also be remixed and released by another artist as part of their original work or a compilation CD of different songs may be created by a different publisher. In such events the artist, the album names, and the release durations may be different while the composition will remain the same. This may be important, especially for copyright management and royalty payments solutions provided by the media content processing system.

Some of the DJ software and mixing board solutions may create a file that contains song titles, artist names, release duration and song segment durations used in the mix. But, this information may be not sufficient to identify songs for royalty management because the only way to do so may be by using text matching techniques. However, text matching technology may be not exact enough for a number of reasons. Many songs by different artists may have the same names because they are remixed and re-released by another artist as part of their original work, or a compilation album of different songs may be created by a different publisher. In this situation, the artist and the album names may be different while the composition and release duration will remain the same. Sometimes the artist re-releases a song but on a different album that may be associated with a different label. Text metadata may be typically inconsistent, incorrect, misspelled or may be simply missing in all music collection. Users (especially DJs) also use alternate names (short hand, nicknames, and personal notes). Additionally, text matching technology may be not definitive enough and may be easily fooled by user by providing incorrect information.

Without accurate copyright information, it may be difficult and prohibitive to creativity to accurately clear media content and process royalties to the correct rights holders. Accordingly, a robust and scalable method and system may be needed that takes into account all of the above issues and applies heuristics with pattern analysis algorithms layered on top of a combination of fingerprinting and text matching technology, and supported by an authoritative normalized relational database of copyright information of recordings and compositions.

Figure 2:
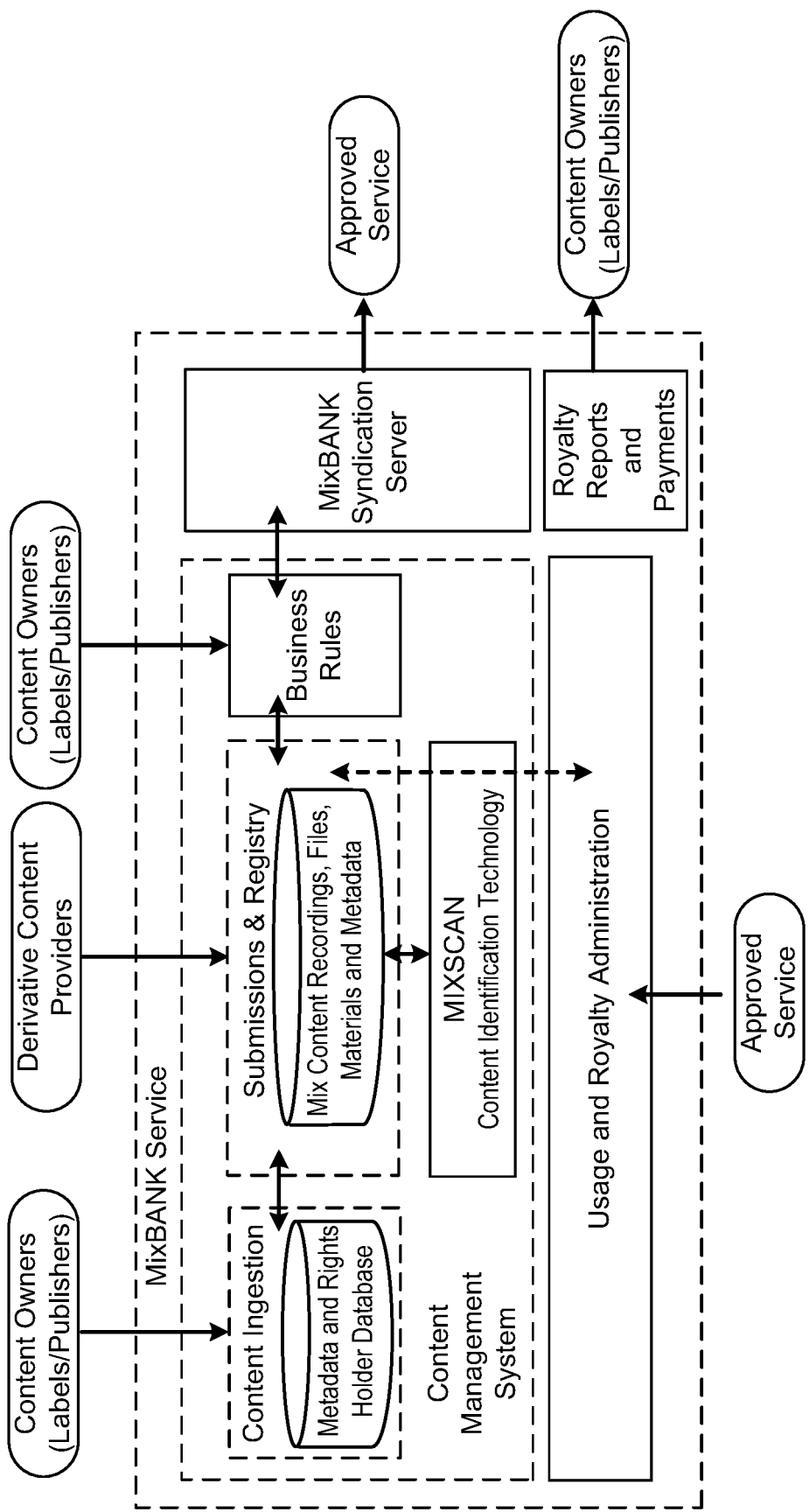
FIG. 2 illustrates an example block diagram of a media content processing system in accordance with various embodiments.

FIG. 2 illustrates an example block diagram of a media content processing system according to various embodiments. Embodiments of the present invention provide a method and system to process and identify, for example, a tracklist of song segments and their duration within a DJ mix or other user-generated media content (e.g., UGC). Identifying the segments of media content ensures that rights holders can get compensated for the use of their original content. Furthermore, identifying the rights holders enables digital music services to update their systems to better track usage for content that is not based on full-length songs.

Because fingerprint technology may be insufficient to recognize derivative works (e.g., such as DJ mixes) with high confidence, in order to do so the inventive technology utilizes specially developed logic based on pattern analysis. This is achieved by first breaking up the derivative work (e.g., DJ mix) into smaller blocks of audio segments and fingerprinting them. The block sizes can vary from 3 seconds to 6 seconds, but it can also be less or more. The blocks can be sequential (for example, taken every three seconds, or overlapping and sequential (for example, taken every six seconds but with three second overlap). The duration of the blocks and whether they are overlapping depends on the DJ mix quality of sound, genre type of songs used in the mix, algorithm tuning, DJ style, etc.

The longer the duration of the block (e.g., more than 6 seconds), the more accurate the fingerprint algorithm can be with potential matches, which as a result increased confidence. This is due to the fact that since there are more acoustic characteristics in a longer block, the fingerprint algorithm processes more information, and there is longer portion of the song to match against a fingerprint database, all of which contribute to higher match confidence. However, due to the nature of derivative works like DJ mixes and remixes, because DJs modify the original recording which change the characteristics of the fingerprint compared to the original song, longer blocks are not always the best approach and can create inaccuracies. Instead, by using smaller blocks (e.g. 3 seconds) and overlapping blocks there is more of a chance to match to the original song. However, with smaller audio blocks other challenges are introduced, such as more matches and false positives, because a smaller audio segment can match closely to other smaller sections in different songs that may be similar enough for the algorithm to think it is a possible match, especially when the original song is modified by the DJ (e.g. DJ talking, sound effects, overlapping songs, BPM changes, etc.). As a result, more information is returned from the fingerprint algorithm, which makes pattern analysis necessary to identify that block or sequence of blocks accurately.

Results for each block's fingerprint match are compared and the matches can vary in distance (i.e., proximity) due to many factors, including for example: (a) whether the segment of the song in the DJ mix was sped up or down, (b) whether the quality of the sound of the original song in DJ's music collection or the resulting DJ mix was not as good due to higher compression ratios or how it was captured from analog into digital form, (c) whether the DJ spoke over that segment in the mix, (d) whether two songs were mixed together, and (e) whether special effects were used, etc. For these reasons, the inventive platform uses pattern analysis to identify patterns in the possible matches returned for each block or sequence of blocks.

According to various embodiments, the media content processing system may implement a pattern analysis on the media content. Pattern analysis may include the identification and text-matching of words or characters in track titles, artist names, unique song identifiers (e.g., ISRC or custom IDs), track durations, etc. (e.g., information we receive from the fingerprint algorithm). Based on the received patterns, the media content processing platform identifies the best-fit candidate among the possible matches. Media content processing may then re-rank the confidence of possible matches based on a strict set of criteria and increases the accuracy of the final result. Patterns can occur in a number of forms, with the most frequent being (a) similar artist names [e.g. Artist 1 (ft. Artist 2), Artist 1] and (b) similar track titles [for example: Song C (Remix 123), Song C (Radio Edit)]. Pattern analysis occurs multiple times throughout the media content processing process.

In another embodiment, the media content processing system, in identifying media content, may implement a pattern analysis for multiple fingerprints in a single block: Fingerprint algorithm returns multiple possible matches for a single block, ranked in order of confidence. This confidence ranking is helpful, but the highest result for each block is not necessarily the most accurate choice—this is due to the likelihood of misidentification/mixed results caused by the challenges faced when fingerprinting derivative works. To improve accuracy and increase confidence, the media content processing looks at the pattern within these initial results from the fingerprint algorithm in a number of ways:

First, the media content processing system, in identifying media content, may identify similar characters in the artist and track names. For example: There are 7 results given for a single block. "Artist 1" appears in 5 of those results in number of variations (e.g. Artist 1 vs. Artist 2 \\ Artist 1 ft. Artist 3 \\ Artist 1 x Artist 2 \\ Artist 1 \\ Artist 1 Feat. Artist 1). Because the system recognized that pattern it ranks all 5 of those results higher than the other 2 in that single block.

Second, the media content processing system, in identifying media content, may, identify low probability character patterns in the artist and track names. Media content processing platform recognizes a number of keywords that are commonly returned by the fingerprint algorithm. It looks at the results from the fingerprint algorithm and, if it recognizes particular patterns in the possible matches, it attributes a lower rank to them as there is a low probability of them being used in DJ mixes (e.g. "continuous dj mix" or "continuous mix" or "tribute" etc).

Third, the media content processing system, in identifying media content, may identify matching unique IDs (ISRCs, etc). Media content processing platform propagates to the top of the priority list all results that contain unique IDs, which in essence prioritizes officially released content over UGC (user generated content).

Fourth, the media content processing system, in identifying media content, may identify high probability character patterns in the artist and track names. Similar to item (2) above, the media content processing platform recognizes a number of keywords that are commonly returned by the fingerprint algorithm. Media content processing platform analyzes the results from the fingerprint algorithm and gives higher rank to possible matches that include certain keywords. For example: 3 of 7 possible matches have the same composition (e.g. "Up All Night), but each is a different version labeled as "remix", "original mix" or "radio edit". Media content processing platform ranks those higher than the other 4 of 7 possible matches because they have a higher probability of being used in DJ mixes. In addition remix versions may contain unique song elements not found in the original or radio edit versions. Remix versions of the composition are the most commonly used by DJs and therefore ranked the highest.

Lastly, the media content processing system, in identifying media content, may identify matching release durations. Media content processing platform recognizes the release durations for each possible match in that single block. For example: release duration of 7:22 matches 5 of the results (e.g., Song 1—07:22//Song 1 (Remix)—04:46//Song 1 (Album Version)—07:22//Song 2—05:12//Song 1 (Original Mix)—07:22//Song 1—07:22//Song 1 v2—07:22). Because the system recognized that pattern it ranks all 5 of those results higher than the other 2 in that single block.

Pattern analysis for multiple blocks in a series and overlapping blocks: Once pattern analysis has completed for each individual block, the media content processing analyzes multiple blocks in a series, overlapping blocks, and their re-ranked possible matches. The platform looks at the top ranked possible matches for each fingerprinted block and compares those matches to surrounding possible matches. The more frequent a possible match appears in sequential or overlapping blocks, the higher likelihood it is the correct match for that block of the derivative work.

As an illustrative example, media content, such as a DJ mix, may be divided into several blocks:

The block from 21:03-21:06 has possible matches ranked in order: Song A, Song B, Song C, Song D, Song E The block from 21:06-21:09 returned no possible matches: [blank]

The block from 21:09-21:12 returned no possible matches: [blank]

The block from 21:12-21:15 has possible matches ranked in order: Song C, Song F, Song G, Song H The block from 21:15-21:18 has possible matches ranked in order: Song B, Song C, Song I, Song J, Song K, Song A The block from 21:18-21:21 returned no possible matches: [blank]

The block from 21:21-21:24 has possible matches ranked in order: Song K, Song C (Version 2), Song C, Song H, Song E Based on these seven blocks, the media content processing platform may recognize that Song C has an evident pattern in the results. It has appeared highest in the results and most frequent in the series of blocks. Based on this result the media content processing platform concludes that Song C is the best possible match for the blocks and will be the match used in the final merging stage. Secondly, pattern analysis can look at both release duration and track start time to increase the confidence of results.

In another example:

The block from 21:03-21:06 has possible matches ranked in order: Song A (release duration (RD) 3:41), Song B (RD 02:13), Song C (RD 04:44), Song D (RD 04:13), Song E (RD 07:23)

The block from 21:06-21:09 returned no possible matches: [blank]

The block from 21:09-21:12 returned no possible matches: [blank]

The block from 21:12-21:15 has possible matches ranked in order: Song C (RD 04:44), Song F (RD 01:44), Song G (RD 02:24), Song H (RD 03:54)

The block from 21:15-21:18 has possible matches ranked in order: Song C (RD 01:43), Song C (RD 04:44), Song I (RD 06:22), Song J (RD 02:53), Song K (RD 03:59), Song A (RD 03:25)

The block from 21:18-21:21 returned no possible matches: [blank]

The block from 21:21-21:24 has possible matches ranked in order: Song K (RD 05:11), Song C (Version 2) (RD 04:57), Song C (RD 04:44), Song H (RD 04:31), Song E (RD 04:23)

Based on these seven blocks, the media content processing platform may recognize that Song C has an evident pattern in the release duration for each potential match. It has appeared highest in the results and is the most frequent release duration in the series of blocks. Based on This media content processing platform concludes that Song C is the best possible match for the blocks and will be the match used in the final merging stage. Similar logic can be applied to the release start time that is supplied in the metadata.

To illustrate, in another example according to various embodiments:

The block from 21:03-21:06 has possible matches ranked in order: Song A (release start time (RST) 01:35), Song B (RST 05:22), Song C (RST 00:44)

The block from 21:06-21:09 has possible matches ranked in order: Song C (RST 00:47), Song B (RST 00:52)

The block from 21:09-21:12 returned no possible matches: [blank]

The block from 21:12-21:15 has possible matches ranked in order: Song C (RST 00:50), Song A (RST 04:12)

Based on these four blocks, the media content processing platform may recognize the logical sequence between Song C; there is an evident pattern. For each sequential 3 second block, the release start time increases by 3 seconds. Based on This media content processing platform concludes that Song C is the best possible match for the blocks and will be the match used in the final merging stage.

Pattern analysis may be implemented, according to various embodiments, to merge the best possible matches to extend the entire duration of the track. For example, there are inevitably blank results returned from the fingerprint algorithm because of all aforementioned challenges that surround derivative works. By looking at the example above, the media content processing platform recognizes the three "blank" results, then looks at surrounding blocks and identifies a pattern which suggests Song C is the best possible match for blocks before and after the [blank] results. Thus, the system determines that Song C is also the best possible match for the two [blank] blocks. Media content processing platform uses this information to merge those best matches together with the surrounding matching blocks, giving the final result of:

The block from 21:03-21:24 is identified as: Song C

Identifying segments of media content according to various embodiments may also include purging. Purging refers to the process of eliminating possible matches we've received from the fingerprint algorithm, based on the fact that other possible matches for the same 6 second or 3 second samples or series of samples are ranked higher and will be used instead, based on the system's pattern recognition logic.

This approach also allows media content processing to create the tracklist of song segments identified in the DJ mix and their durations. This is what enables digital music streaming services to update their systems to properly track playback analytics—plays, skips, etc.

In the event that DJ software or mixing board solutions actually include a file that contains text metadata including, for example, song names, copyright information, and durations of each segment, the media content processing can provide additional intelligence to the method of identification. Music recognition is greatly improved from such a multifaceted approach of using fingerprints and text metadata together, based on the nature of how music is produced, sold, or how derivative works are created. Textual data can be used to increase confidence (e.g., disambiguate) when fingerprinting technology alone cannot do it. The fingerprint and text metadata recognition technologies are integrated into the media content processing platform to work concurrently in a seamless fashion. Using the same example in the previous paragraphs, text metadata could be used to choose Song C as the right match. This would be achievable in fewer steps. For example, the media content processing platform can validate that each block matches Song C without having to do pattern analysis heuristics across multiple blocks before making that same choice with high confidence. This is especially helpful when the derivative work is greatly changed from the original master recording(s) and the fingerprint match is of lower confidence. Textual data can at times also be sufficient, if complete, as the primary recognition approach to identify the right original content even when a fingerprint approach cannot produce a match.

Having the segment duration information in advance can also be of great help. In the event that a match is finally made by the media content processing platform by utilizing one or more of the methods described above, the platform can stop fingerprinting that entire segment and automatically jump to another segment in the mix. For example, using the example above the seven blocks with multiple matches, as soon as the platform identifies that a block or set of blocks are Song C then the rest of the blocks in the segment duration do not have to be fingerprinted. In the case where the segment is 30 seconds and three blocks of 3 seconds each were used to get to the match, the platform can skip the remaining 21 seconds. This approach can greatly reduce the number of generated fingerprints and recognition attempts by the media content processing platform, making the overall process quicker and less costly. Segment information can also help the platform be better informed that this is a new segment and that heuristics and pattern logic can be restarted for this new segment, getting rid of noise in the system from previous matches. An example of noise is when a segment's start and stop times are not known, possible matches from previous blocks are included in the analysis of blocks in a new segment. This adds more data to be considered as a possible match and may add to the overall time to get to the final result. However, when it is known that a new segment has started, all results from previous blocks' matches can be cleared and not considered in identification attempts of the new blocks.

Figure 3:
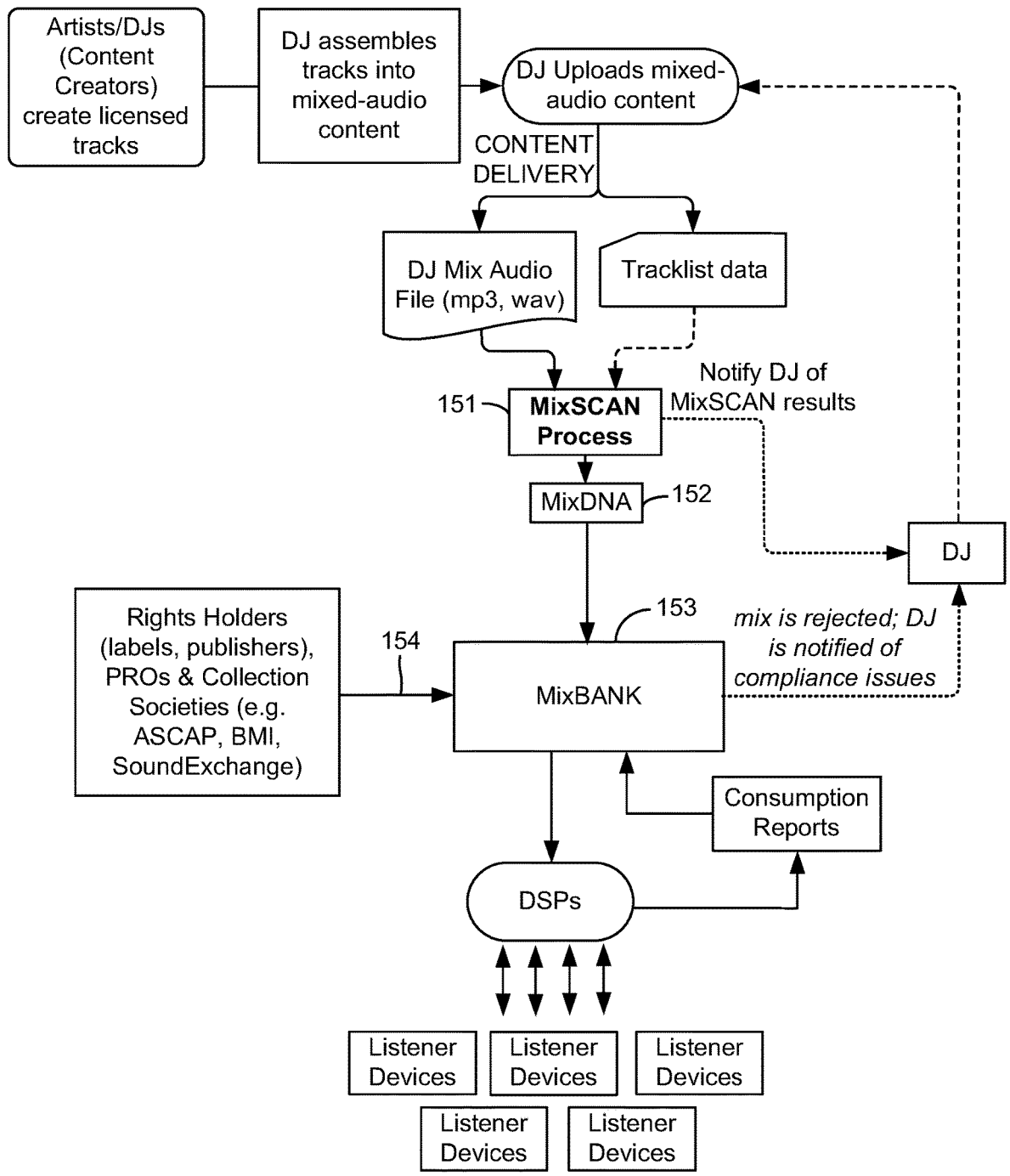
FIG. 3 illustrates an example method of digital processing of media content in accordance with various embodiments.

FIG. 3 illustrates an example method of processing media content in accordance to various embodiments. As an example, FIG. 3 illustrates an overview of the process a DJ mix must successfully undergo in order for it to be licensed properly, distributed in compliance with business rules, and have usage accurately reported. Content providers (e.g., artist, publishers, labels) create licensed tracks or samples. Then, the DJ assembles tracks or samples into mixed-audio content format. The DJ may then upload mixed-audio content to the media content processing module or third-party upload tool (e.g., DSP's upload tool). The DJ may include tracklist data (text file, Serato Cratefile, or Traktor History Playlist) during the mixed-audio content upload, as supplementary textual data.

The following is an example of the textual data provided in the tracklist during ingestion:
Track number
Track start time
Track end time
Track title
Artist name(s)

The media content processing module sends the DJ mix file and supplementary textual fingerprinting data to identify the segments of media content. At (151)—DJ mix is registered, assigned a unique mix ID identifier and ISRC (International Sound Recording Code) and is taken through the media content processing, a technology that parses audio into smaller audio blocks and uses a combination of acoustic and textual fingerprinting, along with heuristics and pattern analysis, to identify individual tracks used within the mix. Once the mix has finished processing, the DJ is notified with the results.

At (152)—The product of the media content processing process is the media content metadata. The media content metadata includes the list of songs (also referred to as the tracklist) used in the mix, with their respective copyright owners, and song segment start and end times within the mix.

At (153)—The media content metadata is analyzed within the media content processing system to validate and clear mixes for distribution. This process checks each included song/composition in the tracklist against usage and distribution business rules set by the rights holders. If business rules exist that prevent use and distribution of the song/composition, the whole mix is rejected and the DJ receives notifications that highlights the reason. A DJ can then edit or alter the mix, and resubmit it through the entire process outlined in FIG. 3, or report a claim for manual review. If there are no business rules that prevent songs/compositions in the media content metadata from being used and distributed in mixes, the mixes are cleared for distribution to the applicable digital service providers (DSPs).

DSPs then make the content available across their platforms, allowing listeners to stream the audio content of that mix through their devices ("Listener Devices"), which include smart phones, desktop computer, laptops, home entertainment systems, vehicle entertainment systems, gaming consoles, etc.

DSPs report back consumption data by providing the durations of mixed-audio content streamed by those listening devices, organized by country where the device was registered. These are reported back by Mix ID and/or ISRCs assigned by the media content processing system, or other agreed to identifiers. In some embodiments, the media content processing system performs post-processing to calculate consumption and royalty information for each recording/composition used in mixes.

At (154), once post-processing is completed, royalty reports and payments are prepared and distributed to rights holders, PROs and collection societies worldwide. The same process in FIG. 3 may be applied to both DJ mixes and remixes. In mixes, DJs use a more than one song segment. Remixes are based only on one song.

Figure 4:
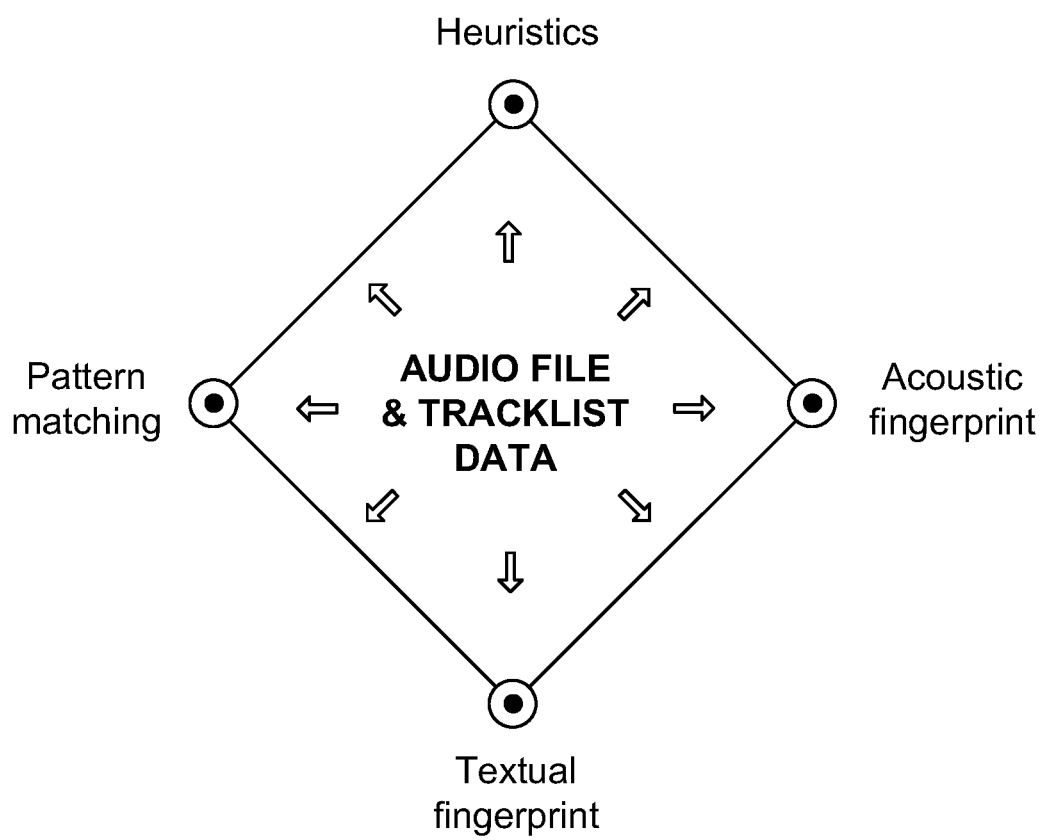
FIG. 4 illustrates an example overview of processing media content in accordance with various embodiments.

FIG. 4 illustrates an example overview of identifying segments of media content according to various embodiments. The process to identify segments of media content may include a combination of heuristics, pattern matching, acoustic fingerprinting, and/or textual fingerprinting, using audio file and tracklist data and/or other media content metadata.

Figure 5:
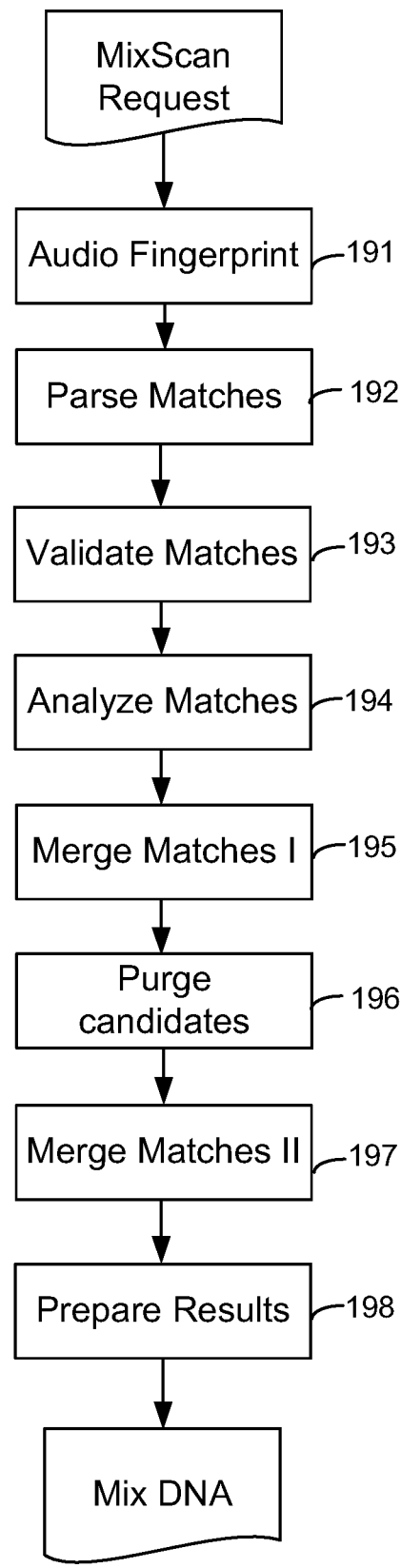
FIG. 5 illustrates an example method of processing media content in accordance with various embodiments.

FIG. 5 illustrates an example method of processing media content according to various embodiments. As an example, the media processing system may perform the following steps in identifying the segments of media content submitted by the user:

- At (191) Audio Fingerprint—break up the file into micro audio blocks (using history file when available in advance to group the relevant sections), create fingerprints and query fingerprint database for candidate matches
- At (192) Parse Matches—parse fingerprint candidate matches for processing
- At (193) Validate Matches—scan parsed results for errors
- At (194) Analyze Matches—grade responses, use available text data from history files to disambiguate candidate matches, and note time values (duration, position)
- At (195) Merge Matches I—analyze candidate match patterns, identify tracks that are considered the same and merge them
- At (196) Purge Matches—scan the merged track for candidates that are incorrect
- At (197) Merge Matches II—scan the track list again for more merging candidates Optionally, a 2nd pass fingerprinting is performed—where steps 191-197 are repeated on unmatched areas
- At (198) Prepare Results—perform final analysis to merge tracks and create media content metadata (e.g., MixDNA)

In some embodiments, the media process may include an editorial review. For example, music researchers may complete the media content processing on popular DJs, mixes or due to claims. This may be achieved by reviewing the available tracklist details for each song segment within the mix.

Figure 6:
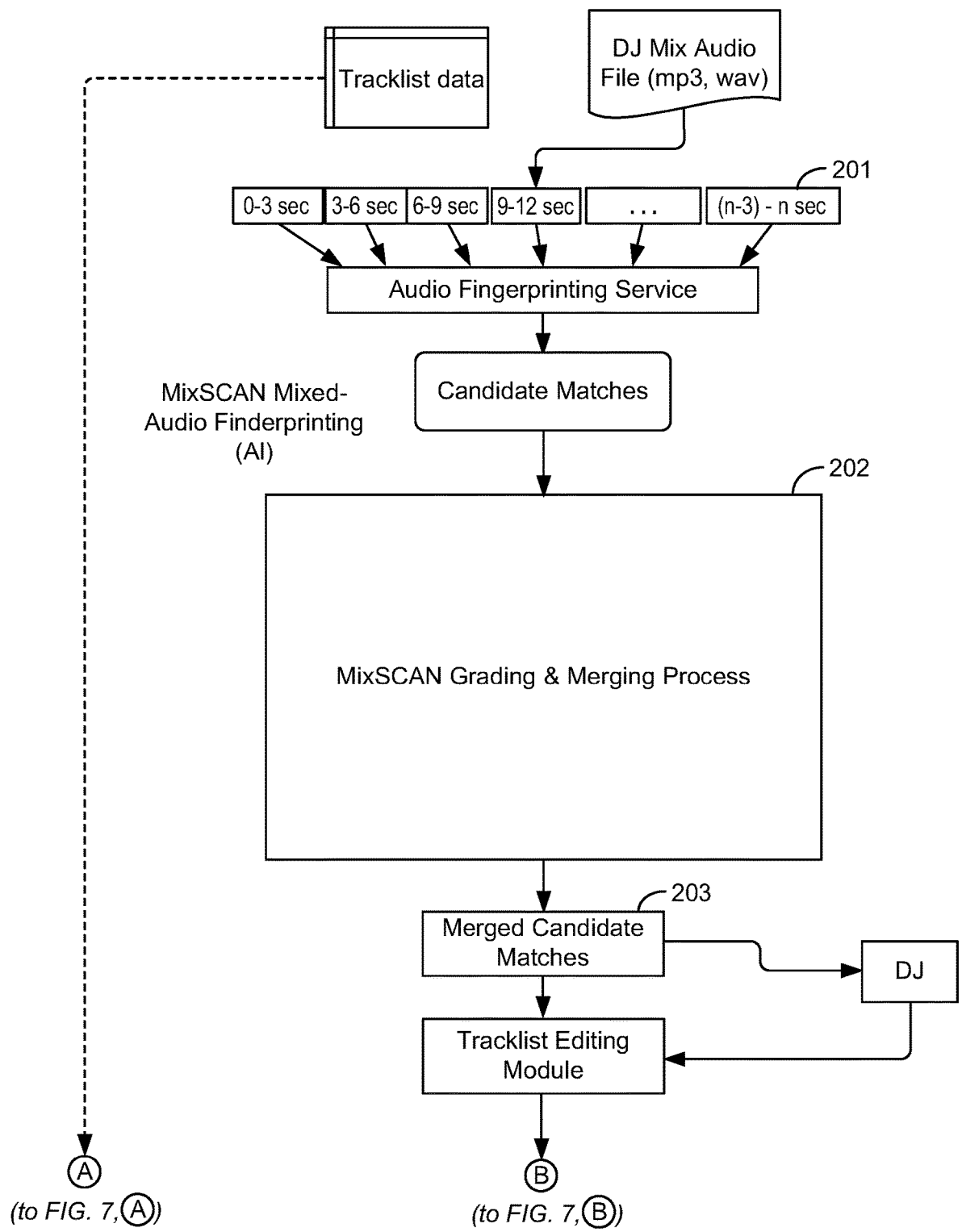
FIG. 6 illustrates an example method of identifying segments of media content in accordance with various embodiments.
Figure 7:
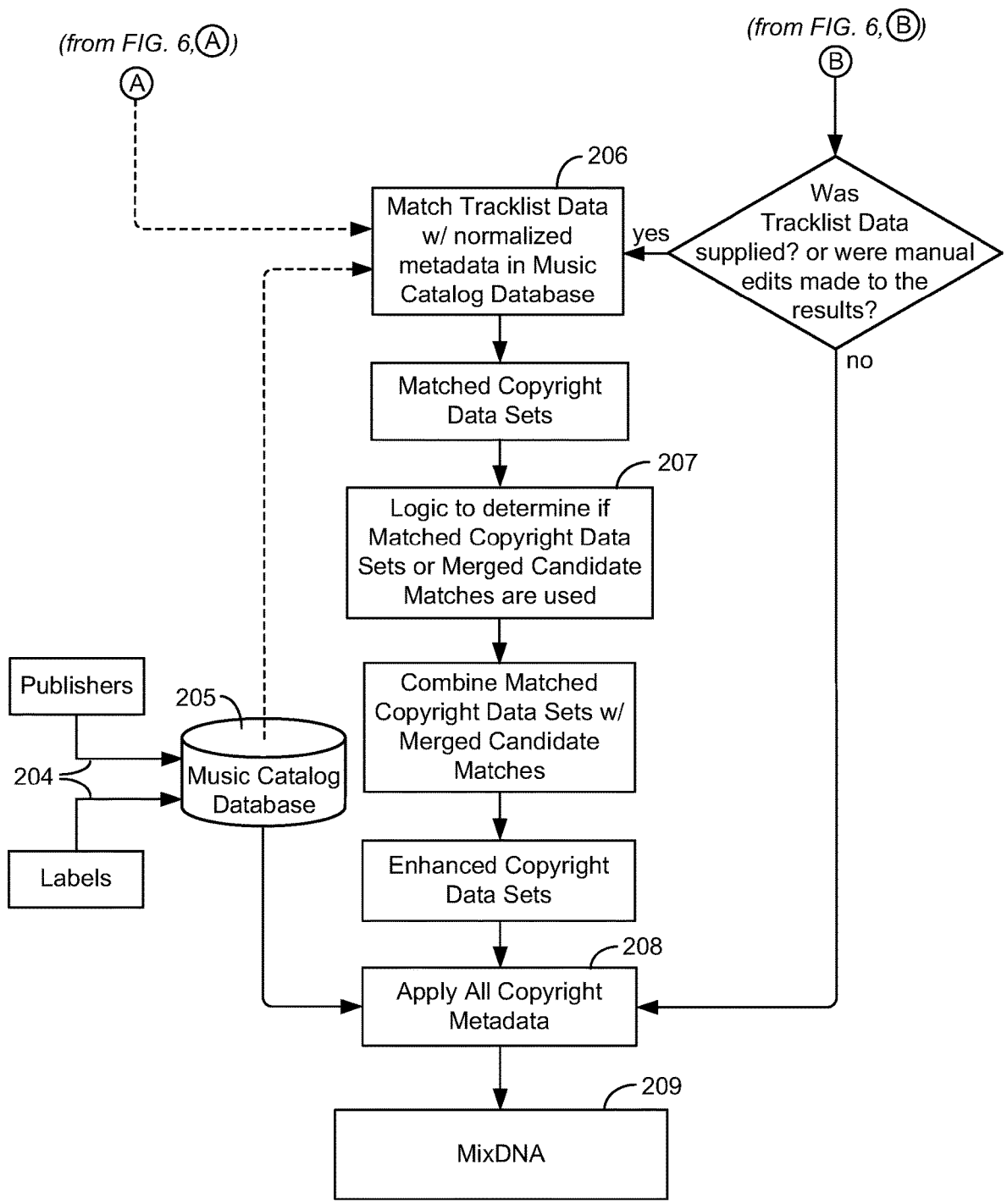
FIG. 7 illustrates an example method of identifying segments of media content in accordance with various embodiments.

FIG. 6 illustrates an example of method of identifying segments of media content according to various embodiments. FIG. 7 shows a continued overview of the media content processing mixed-audio fingerprinting process. The process identifies songs within a mix, associated copyright owner information to identified songs, and generates the media content metadata. In this illustrative example, a DJ provides the mix's audio file and the optional tracklist details. The DJ also selects one mandatory and one or more optional genres that broadly describe the mix type. For example: DJ may select "Progressive House" and "Techno."

At (201)—The media content processing system parses audio file into smaller micro audio segments (e.g., 3 seconds or 6 seconds). The micro audio segments are processed by the audio fingerprinting service. The fingerprinting service analyzes each micro audio segment's acoustic signature and identifies all the possible candidate song matches available in the fingerprint database. For every micro audio segment, there are commonly several to hundreds of potential matches in the fingerprinting service because of all the nuances described above with how music is released, and how DJs modify it in mixes and remixes, each having its own unique set of basic metadata and resulting copyright information. The following are examples of what matched results may contain: i) Track Titles, ii) Artist Names, iii) Album Titles, iv) unique 3rd party identifiers, and v) ISRC data (if available). ISRC is The International Standard Recording Code (ISRC) is an international standard code for uniquely identifying sound recordings and music video recordings.

Figure 10:
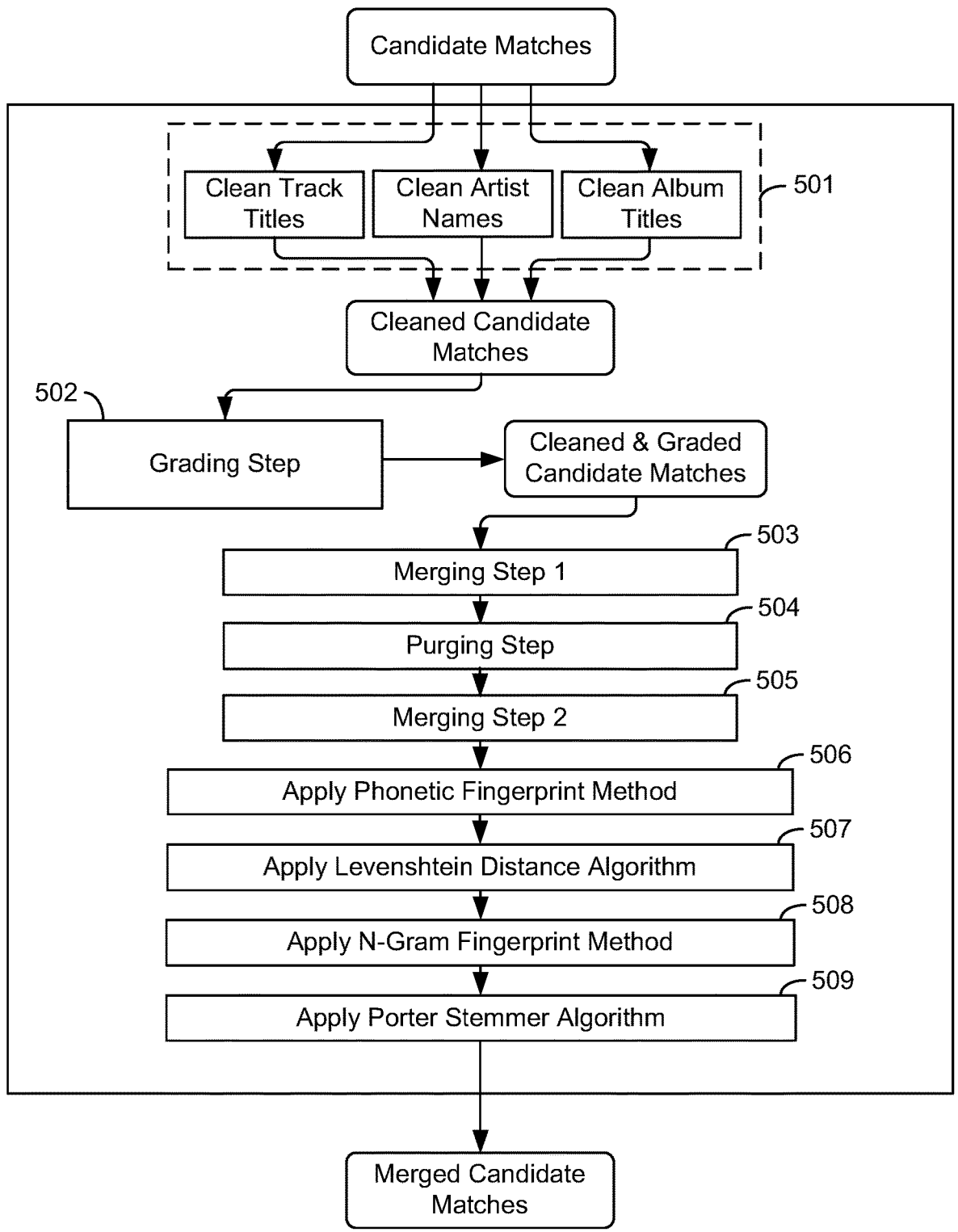
FIG. 10 illustrates an example method of identifying segments of media content in accordance with various embodiments.

At (202)—Candidate matches (fingerprint match candidates) are processed through the grading and merging process outlined in FIGS. 5 and 10. All fingerprint match candidates are cleaned and normalized before proceeding. Each fingerprint match candidate is also graded according to specific criteria explained in FIG. 10. After cleaning and grading, only the clean album titles, artist names and track titles are used for comparison and further processing. Each cleaned and graded scan item runs through a number of phonetic, pattern-based algorithms to determine a single scan item for each audio block (i.e., audio segment). The results of these algorithmic processes are merged together and converted into a format used for further processing. In some embodiments, (201) and (202) may be repeated by one or more additional fingerprinting techniques. In some embodiments, (201) and (202) may be repeated one or more times (i.e., one or more additional passes) on audio segments that remained unidentified as having potential matches in the fingerprinting matches. The techniques or technology used in the repeated passes may be altered to produce additional merged candidate matches.

For example, a pass of (201) and (202) may include use of a technology and/or techniques from one entity (e.g., a company), and another pass of (201) and (202) may include use of a technology and/or techniques from another entity. Fingerprints in media content databases (used for matching to segments), for example, may be constructed differently and may contain different information therein. A first media content database containing fingerprints may be utilized for currently popular content, and a second media content database containing fingerprints may be utilized because it contains additional contextual content specific to a particular style of music, such as DJ mixes and/or remixes, or specific genres within the mixes and/or remixes. By using multiple techniques and technologies in this manner, the currently popular content for particular audio files may receive higher match rates (e.g., for merged candidate matches), while reducing the number of audio segments that remain unidentified and reducing the need for follow-on passes of these segments. Because unidentified audio segments or files, following a first pass, may be assumed to be from less popular content or specific to a particular DJ mix and/or remix style, follow-on passes and/or queries may be made utilizing the second media content database containing fingerprints.

As another example, a pass of (201) and (202) may include use of a technology and/or techniques from one entity, and another pass of (201) and (202) may include use of a technology and/or techniques from another entity. The first pass may include settings and/or technology that is more stringent (i.e., having a lower tolerance for variations) during analysis by the audio fingerprinting service. In particular, the first pass may have a lower tolerance for changes to the pitch, timing changes (such as what is likely to be found in DJ content), and/or changes to other audio characteristics. A second or further pass may include settings and/or technology that is less stringent during analysis by the audio fingerprinting service. In particular, the second pass may have a higher/broader tolerance for the changes to the audio pitch, timing changes, or changes to other audio characteristics. Unidentified audio segments or content from the first pass may be processed through a second or further pass to increase the likelihood of identifying the segments or content and to produce more merged candidate matches. Use of multiple passes in such a way likely reduces the incorrect identification of audio segments or content, which leads to fewer false positive identifications, and which ensures more accurate results.

As yet another example, to produce similar benefits as in the prior example, the original fingerprints stored in one or more media content databases, may be modified to create multiple differing versions, which may each be stored back into the one or more media content databases. The versions of fingerprints may differ in the audio pitch, the timing, and/or other audio characteristics from the original reference fingerprints. The multiple versions in the one or more media content databases may be utilized in the first or second or further passes of the prior example, when trying to identify segments of audio or content. In this manner, the likelihood of identifying segments or content to produce candidate matches is increased on the first pass, reducing the likelihood of utilizing the second or further passes.

As another example, to produce similar benefits as in the prior two examples, the results of the first pass may be utilized to make better identifications or decisions in the second or further passes. In particular, as discussed above, the first pass may have a lower tolerance for changes to the pitch, timing changes (such as what is likely to be found in DJ content), and/or changes to other audio characteristics. A second or further pass may include settings and/or technology that is less stringent during analysis by the audio fingerprinting service. In particular, the second pass may have a higher/broader tolerance for the changes to the audio pitch, timing changes, or changes to other audio characteristics. The first, second, and/or further pass may utilize the multiple differing versions of fingerprints in the one or more media content databases described above. The second or further pass may operate on and use the results from the first pass (e.g., the audio segments identified in the first pass) to produce additional or better results. Specifically, it may be determined whether results from the first pass include candidate matches that also are candidate matches in the second pass. Such use of the results of a pass in subsequent passes may improve identification accuracy for audio segments or content, may decrease false positive identifications, and also decrease false negative identifications.

At (203)—The result of the media content processing's grading and merging process is a series of merged candidate matches, which is displayed to the DJ in the form of a tracklist. The DJ may be sent notifications to give them an opportunity to alter the results. DJs can then access a tracklist editing module where they can request to and/or modify the information found in the results of Media content processing's Grading and Merging Process. The information displayed to the DJ for editing is limited to A) track title, B) artist names, C) track start time, and D) track stop time.

At (204)—Publishers and labels supply copyright metadata by providing their entire catalog of licensed tracks or compositions via .xml (proprietary or industry standard specifications such as DDEX or CWR), .csv, .xls files, or direct ingestion. Examples of the metadata provided by publishers and labels includes the following information:
Release Name
Composition Name
Primary Album Artist
Release Artist: Featuring(s)
Release Artist: Remixer(s)
Release Artist: Composer(s)
Release Artist: Orchestra(s)
Songwriter(s)/Composer(s
Album Title
Album Label
Album Copyright Notice
Label Catalogue Number
Release format (Full Length/EP/Single)
Label(s)
Label Owner(s)
Publisher(s)
Publisher Owner(s)
UPC
Supported Commercial Business Model
Release Date
Sale Start Date
Track Number
Track Artist
Track Title
Track Copyright Notice
Release Duration
ISRC
Track Primary Genre
Track Secondary Genre(s)

At (205)—The music catalog database (sometimes also referred to as a media content database) is a relational database of normalized recording and composition copyright information and metadata supplied by publishers and labels. It is supplemented by information obtained from 3rd parties and by editorial research. This database is an authoritative source for copyright information and enables association of accurate release and copyright information for licensed content matched by the fingerprinting service through pattern analysis algorithms. Additionally, it supplements gaps (e.g., or missing data) in tracklist provided by the DJ and candidate matches from fingerprinting service. Complete and accurate licensing information must be attached to every licensed piece of content within the DJ mix in order to clear licensing business rules and for it to be distributed (e.g., data list provided in 204 is what is needed for complete and validate/clear content for distribution).

Figure 11:
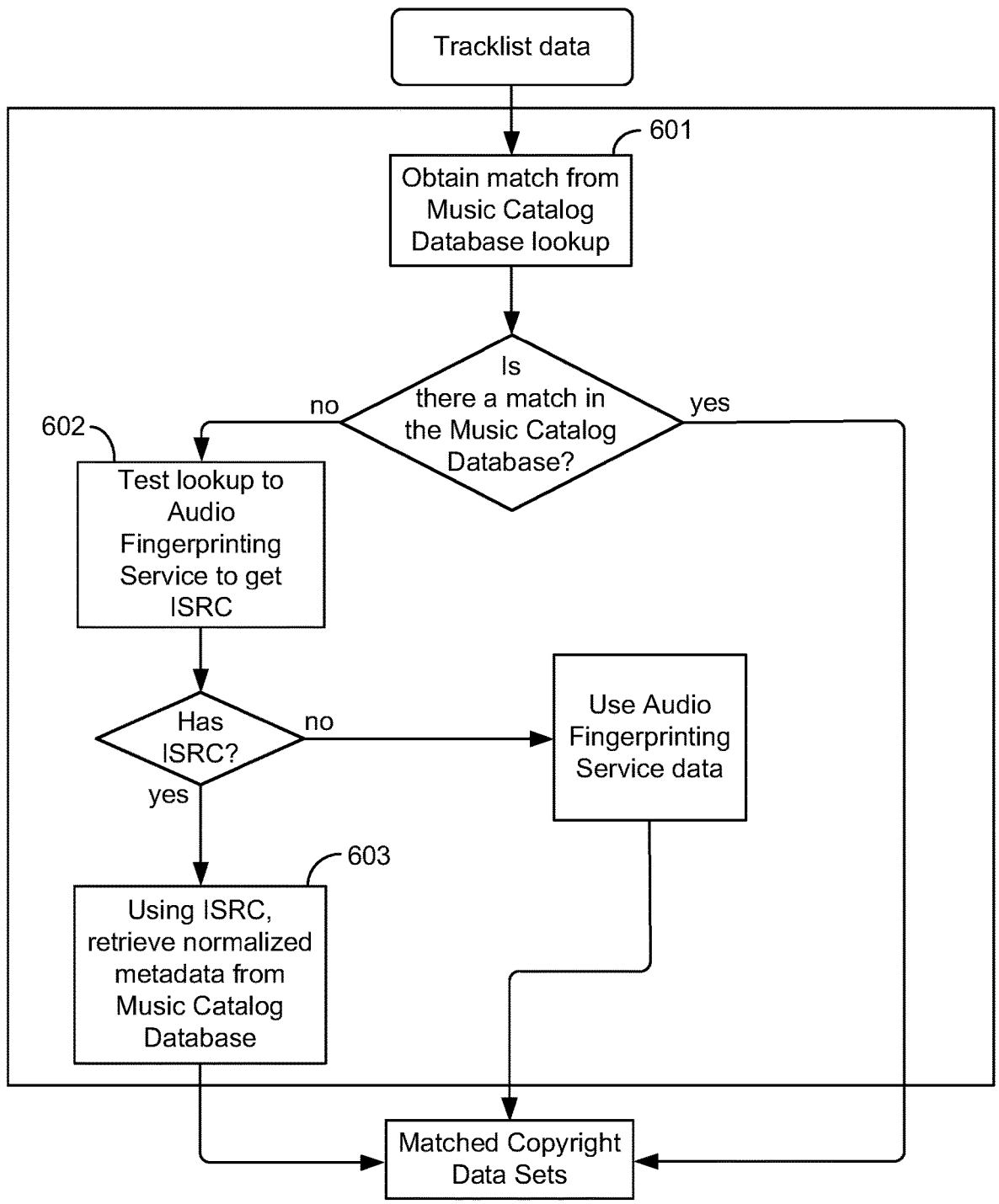
FIG. 11 illustrates an example method of identifying segments of media content in accordance with various embodiments.

At (206)—If the DJ (A) attaches tracklist data to a mix, or (B) alters the tracklist using the Tracklist Editing Module, those edits or additions are matched to the normalized metadata contained within the Music Catalog Database via textual data matching, a process outlined in FIG. 11. The results are matched copyright data sets.

If the DJ did not supply supplementary textual data or make manual edits to the tracklist, the mix goes straight to apply all copyright metadata at step (208). At (207)—In some cases the matched copyright data sets can conflict with the merged results produced by the media content processing's Grading and Merging Process. Conflicts occur when the start time and end time of a particular matched track title conflicts with the start and end time of a merged candidate matches. Using logic, the media content processing compares the information within the conflicting copyright data sets with non-conflicting copyright data sets within the mix (e.g. track duration, genre, similar artists), compares it to other Media content processing match candidates that may have been ruled out in previous steps, and purges the least likely data set from the final copyright data sets. The remaining sets of data are merged, resulting in Enhanced Copyright Data Sets. These Enhanced Copyright Data Sets contain the following:

Track title
Artist name
Track start time
Track stop time
Total duration

In the event that a conflict still exists after this step, the DJ is notified and the mix can be targeted for editorial review to resolve the conflict. At (208)—Once all changes have been made to the mix, all remaining copyright metadata not included in the Enhanced Copyright Data Sets is attached via the Music Catalog Database. This step ensures that we include all the required licensing information for every individual track contained within the mix, to the mix.

Completed copyright metadata includes: file name, track title, artist, album title, work, composers, supported commercial model, start date, release date, genre, track number, disc number, rating, composer, label, label owner, publisher, publisher owner, International Standard Recording Code (ISRC) and Beats Per Minute (BPM).

At (209)—The output of the media content processing process is the media content metadata, which is a unique track by track string of normalized copyright metadata, including start and end times for each song segment, within a DJ mix. The media content metadata is stored in our system as a unique identifier and is tied directly to the mix file. The application of the media content metadata becomes essential for clearing mixed audio content, proper reporting in the post-processing stage of media content processing.

The media content database provides rights holders may control over usage and distribution of their catalogs used within mixes and remixes. According to various embodiments, there may be two ways to set rules in the media content database—automated and manual. According to various embodiments, in automated rule setting, the media content database was designed to use already created industry standards to help rights holders automate the process and reduce amount of work they have to do to create business rules.

Using music as the media content as an example, DDEX ERN specification may be an example of industry standards depending on the type of media content. While the publishing community has not standardized on DDEX ERN, the major record labels, larger Indie labels and distributors have. DDEX ERN includes territory rights, license information and other rules that labels include in catalog feeds to music services. The media content database may detect such rules during ingestion and applies them automatically to recordings.

The media processing system may also provide a CSV file template for labels and distributors who do not support DDEX ERN, and may make similar use of it to automate parts of the rules creation. However, publishers may use CWR and CSV file approaches. Territory information and ownership splits may also be automated through these business rules.

According to various embodiments, in manual rule setting, the media content database also provides rights holders additional capabilities within their account dashboards to set additional business rules. Examples of these rules are below:

Blacklist Control—globally blacklist artist, song, songwriter or composition from use in mixes
Territory Control—prevent your music from being used or distributed by territory
Track Control—limit the number of instances your music may be used per mix
Remix Control—control the use of songs within remixes
DJ Control—blacklist DJs from using your content
DSP Control—prevent your music from being distributed to DSPs Other rules are also available and/or can be applied, such as duration control (how much of the original song can be used in UGC), match rate (how much of the UGC content is acceptable to recognize before distribution), and others that give the rights holders more control over how their catalogs are used. These additional rules can also be integrated into DDEX or CSV file format to automate the manual rule setting process.

According to various embodiments, the media processing system may also perform clearance and distribution. As part of the clearance process, the media processing system may validate the mix. Mix validation may include three key points that have to be satisfied in order to validate the mix/remix and clear it for distribution.

1) Are all rights holders known for sound recordings used in the mix/remix?
2) Are there any business rules that prevent the mix/remix from being distributed?
3) If it may be a mix, have we identified the minimum match duration?

Once the sound recordings used in mixes or remixes are identified, the media content database associates them with the rights holder copyright information. The rights holder copyright information may be used to see if there are any rules set by the rights holders that prevent or limit distribution of mixes/remixes with their master recordings.

In an embodiment, there may be three states that a mix/remix may be assigned.

BLOCKED—If a business rule exists that prevents the mix from distribution, it may be marked as blocked and will not be distributed to any music service, a specific music service, or a territory.
PENDING—If a master recording may be identified but the rights holder information may be not known to us, the mix/remix will be marked as pending. Pending content may be not distributed unless the content clearance policy may be satisfied (e.g., clearance satisfies a threshold).
CLEARED—If there are no business rules that block or limit the mix from distribution, it may be marked as cleared, an ISRC may be assigned and it may be put in a queue for distribution.

However, if at any point business rules are changed, added or deleted, all registered mixes and remixes are reassessed and their state may be modified accordingly. Affected items that were previously distributed are issued takedowns with music services or updated information may be provided, as needed. Items that were blocked previously may be cleared as a result of rule changes.

Lastly, the durations for each identified song segment within the mix may be determined and added to get the total duration for identified content. If the total duration may be equal to or greater than the minimum required percentage of the overall mix duration, the mix may be eligible for distribution. In some embodiments, an editorial review may be performed, as needed, on mixes from popular DJs to ensure that they meet the minimum duration criteria to be distributed.

In distribution, according to various embodiments, cleared mixes and remixes are marked for distribution. The default protocol for distributing mixes/remixes may be DDEX ERN and includes delivery of the digital assets, the unique mix ID and ISRC which are unique and are assigned to each mix or remix, associated mix/remix metadata, artwork, and (if requested) media content metadata information. Territory rights, takedowns, corrections, and other supported commercial details are communicated via DDEX ERN.

According to various embodiments, the media processing system may also include reporting services. For example, music services may be contractually obligated to provide the media content consumption reports in order for the media content processing system to report and administer royalties to the rights holders.

Unlike traditional royalty payments, whereby a play may be tallied after a brief listener auditing period (e.g., usually 30-45 seconds), mix royalties may be calculated on blocks of time individual listeners have actually listened to a mix. As such, the media content processing system may modify its reporting from music services to track all plays to 1 second granularity. For example, music services may report to the media content processing system all mix plays per subscription type, per territory. For each mix, a start and end time of the mix play may be included.

The media content processing system may utilize the media content metadata information to calculate how much of each song segment within the mix was actually played. All song segment plays for a song are added to get the total amount of time a song was played. That total amount of time may be then divided by an average song length of 4 minutes 20 seconds to get the actual play counts, including any partial plays that are left over.

Once the length of each song segment used in the mix (e.g., the media content) may be known, the media content processing system may apply the appropriate asset estimation model. For example, an agreed to business model (e.g., per stream, per user or rev share) may be applied to generate the required reports for the rights holders and to pay royalties. For example, DJ gets paid on the total duration of the mix play, using the same average song length to figure out how many song plays it contained.

Remixes may be treated in the same way as sound recordings in a music service. 30-45 second sample plays may be allowed (e.g., free) and the reporting does not have to change, depending on music services existing agreements with the rights holders. The media content processing system may process remix reports and administers royalty payments to the rights holders on behalf of the music service.

According to various embodiments, the media content processing system may also provide Secure Account Management services. The media content database provides convenience for individuals and entire organizations to sign on to the platform to administer their content. Each organization has their own dashboard which may be customized to their organization type, with relevant views and functionality. Each organization also may have multiple roles, depending on level of permissions that a user needs or may be allowed to be assigned—member, admin, and owner.

The secure account management service, according to various embodiments, may allow:

Self-managed DJs to upload their own tracks, while a manager may be managing the catalog of several DJs; view reports on usage, consumption and revenue information Rights holders to have master accounts with the ability to assign multiple logins with various permission tiers to manage their repertoire and business rules; see account information, and perform various internal administrative tasks for their whole roster or specific labels or publishers on their roster; view reports on usage, consumption and revenue information Music services to create new program offers and financial terms for rights holders to approve or to manage multiple programs as bundles.

In another embodiment, the media content processing system may provide Rights Holder Catalog Ingestion services. The media content processing system may request information from rights-holder partners in order to properly connect songs used in mixes and remixes to the appropriate parties, to accurately identify rights holder content and allocate/distribute royalty payments. Information may also be requested to manage and update business rules for compliance on a timely basis.

For example, standard commercial metadata may be delivered by labels via:

Full DDEX ERN, delivered directly through normal supply chain OR data aggregation partner (e.g., such as MediaNet).

Use of CSV file template if DDEX ERN may be not supported

Direct phone or email contact with account representatives may handle edge-case additions, takedowns, rights collision management etc.

Figure 8:
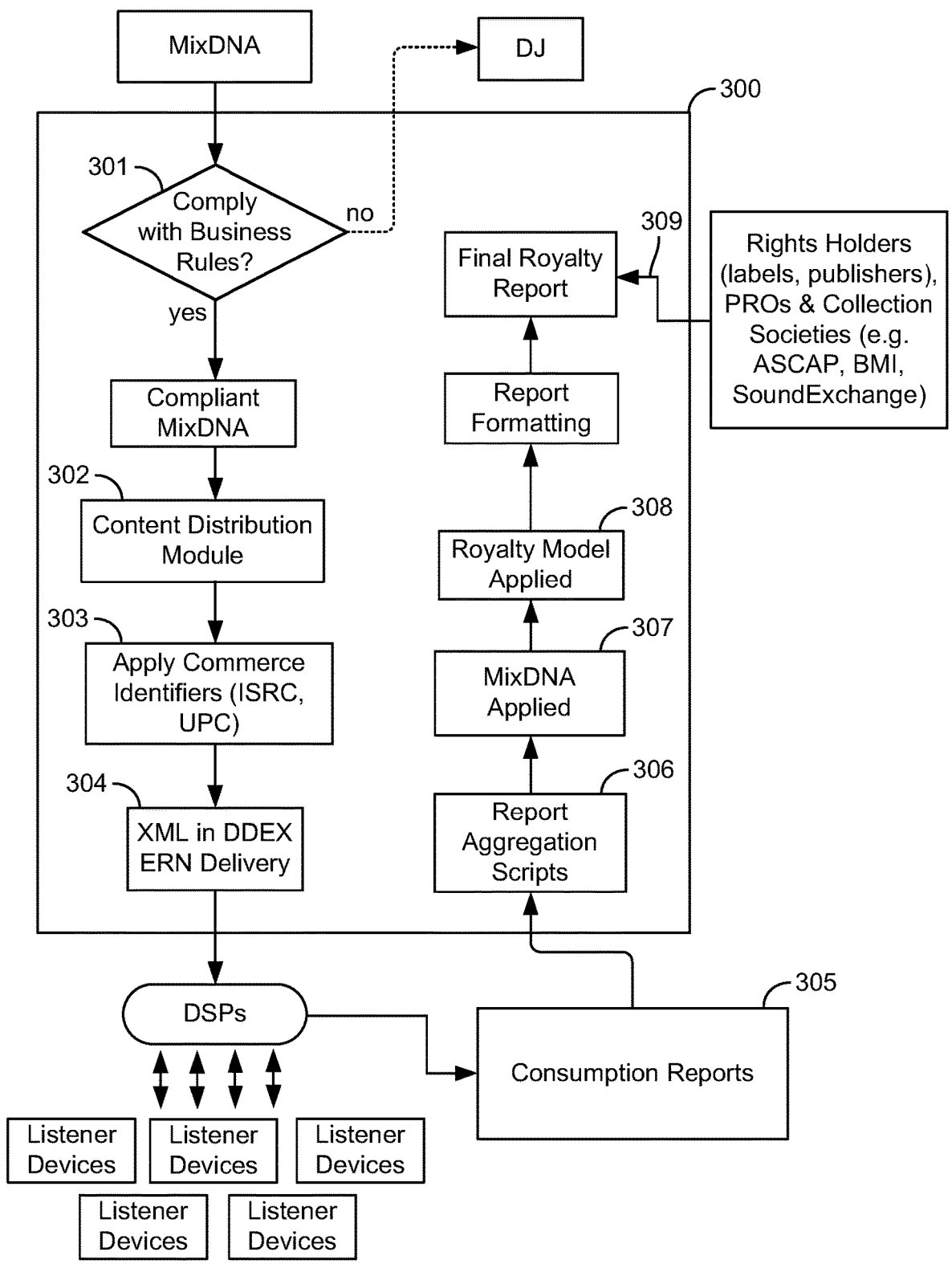
FIG. 8 illustrates an example method of identifying segments of media content in accordance with various embodiments.

FIG. 8 illustrates an example method of processing media content according to various embodiments is an overview of the media content processing system. The media content processing system provides an interface for facilitating the distribution of content to DSPs (Digital Service Providers, a.k.a. music services); including the final steps of pre-processing and the entirety of post-processing. For example, media content metadata may be sent to the media content processing system.

At (301)—The media content processing system runs the metadata contained in the media content metadata through business rules defined by DSPs, labels, and publishers. Business rules are created automatically from label and publisher catalog feeds, and can be augmented manually through label and publisher dashboards in the media content processing system. Business rules include blacklisting artists, songs, albums, composers, compositions from use and distribution in mixes and remixes; territory controls to specify where content can or cannot be distributed; duration control for how much of the original master recording can be used in mixes or remixes; remix control for controlling how catalogs can or cannot be used in remixes; and many others.

If the media content metadata does not comply with business rules, the DJ mix is rejected and the DJ is sent an email notification with reasons for rejection. If the media content metadata is compliant with business rules, the output is a flagged "compliant" media content metadata. Compliant media content metadata is the metadata container file for a mix that has complied with each and every business rule and as such can be distributed to DSPs.

At (302)—The content distribution module may be an interface the DJ uses to select the DSPs where he or she can and wants to distribute the content. At (303)—Once the distribution targets have been set in the content distribution module, the media content processing system applies commerce identifiers (e.g., unique ISRC code) to the mix. The ISRC is the music industry standard for licensing content for distribution. In other words, the technology allows us to apply these commerce identifiers as if the DJ's mix were a single and album released by a record label or publisher. The ISRC is alphanumeric, using digits (e.g., the ten Arabic numerals 0-9) and the 26 letters of the Roman alphabet. The ISRC consists of twelve characters representing country (e.g., 2 characters), Registrant (e.g., 3 characters), Year of Reference (e.g., 2 digits) and Designation (e.g., 5 digits).

For visual presentation it is divided into four elements separated by hyphens and the letters ISRC should always precede an ISRC code. The hyphens are however not part of the ISRC.

[Country Code-Registrant Code-Year of Reference-Designation Code]
e.g. ISRC FR-Z03-98-00212
FR=France
Z03=Mercury France
98=1998
00212=serial number At (304)—In the final stage of packaging the mix for delivery and distribution, The media content processing system prepares the digital assets (e.g., mix/remix, artwork, etc.) and associated metadata (mix/remix DJ, name, genre, duration, etc.), and the media content metadata (e.g., track-list info about song segments and their start/end times within the mix) to be delivered via extensible markup language XML in DDEX ERN format or in DSP proprietary specifications. XML stands for EXtensible Markup Language. XML was designed to store and transport data. XML was designed to be both human- and machine-readable.

DDEX: Digital Data Exchange Standard
ERN: Electronic Release Notification Standard DDEX has standardized a series of Message Suite Standards that define the syntax and semantics of business metadata exchanged by members of the digital media delivery chain. Amongst these are notifications of new products, including updates, to Digital Service Providers. That standard, the Electronic Release Notification Standard (ERN), can also be used when a catalogue of Releases is transferred from one record company to another record company. This standard defines the process and Choreography for the notification of the intent of a catalogue transfer (e.g., typically from the "selling" record company to its distribution partners, or DSPs), the notification of a completed catalogue transfer (e.g., typically from the "selling" record company to its DSPs) and the provision of label copy information to the "buying" record company by the "selling" record company. The process defined herein may also be used to inform third parties such as Music Licensing Companies or chart companies about a catalogue transfer.

After the data has been properly formatted, the mix is sent to the DSPs. DSPs then distribute that content amongst their various platforms, allowing their listeners to stream the audio content of that mix through their devices ("Listener Devices"), which include smart phones, desktop computer, laptops, home entertainment systems, vehicle entertainment systems, etc.

At (305)—DSPs report back to the media content processing system in the form of consumption reports. These consumption reports record the total number of times a remixes was streamed or total duration a mix was streamed by the listener devices and at what specific times within the mix listeners started and stopped streaming. The start/end times a mix was streamed are required to calculate which songs were actually played and to calculate accurate consumption and royalty information. Reports can include additional details covering a wide variety of metrics (e.g. total views, total plays, favorites, playlist adds, market share information compared to other content streamed, etc). Collectively, the play counts for remixes, start/end times a mix was streamed, territory mix/remix was streamed to, and subscription type it was streamed from are required to calculate accurate royalties.

At (306)—The reports submitted by the DSPs are reported in numerous formats. Although these formats are similar and procure the same result, reports are run through aggregation scripts in order to consolidate and standardize.

At (307)—Once the reports have been standardized, the media content processing system reapplies the media content metadata in accordance with the mix's unique Mix ID and/or ISRC commerce identifier, which is attached to the DSP reports. Once the media content metadata has been applied, we can accurately match the information in the reports to the rights holder metadata contained in the media content metadata.

At (308)—Calculating remix royalty is straight forward by multiplying the number of plays for a remix by the royalty. Mixes require a unique royalty model, which is applied to the mix using the standardized consumption reports and copyright metadata stored within the media content metadata. The model begins by using the total duration consumed for that mix. By comparing the start/end stream times of the mix to the media content metadata, song segments that were actually streamed and their duration are identified. All durations for a song segment across all mixes it exists in from that report are added, and are then divided by the average full length track duration, e.g., of 4 minutes and 20 seconds to get a play count. Once the play count has been calculated for the song used across all the mixes in that report, pre-negotiated royalty rates are used to calculate the precise royalty for each rights holder identified for that original master recording.

The output of the report processing is a final royalty report in a format agreed to with the rights holders, which includes the play counts and royalty amounts. At (309)—This flow represents the number of final royalty reports that will be sent out to multiple rights holders (e.g., labels, publishers), performance rights organizations (PROs) and collection societies (e.g., ASCAP, BMI, SoundExchange).

Figure 9:
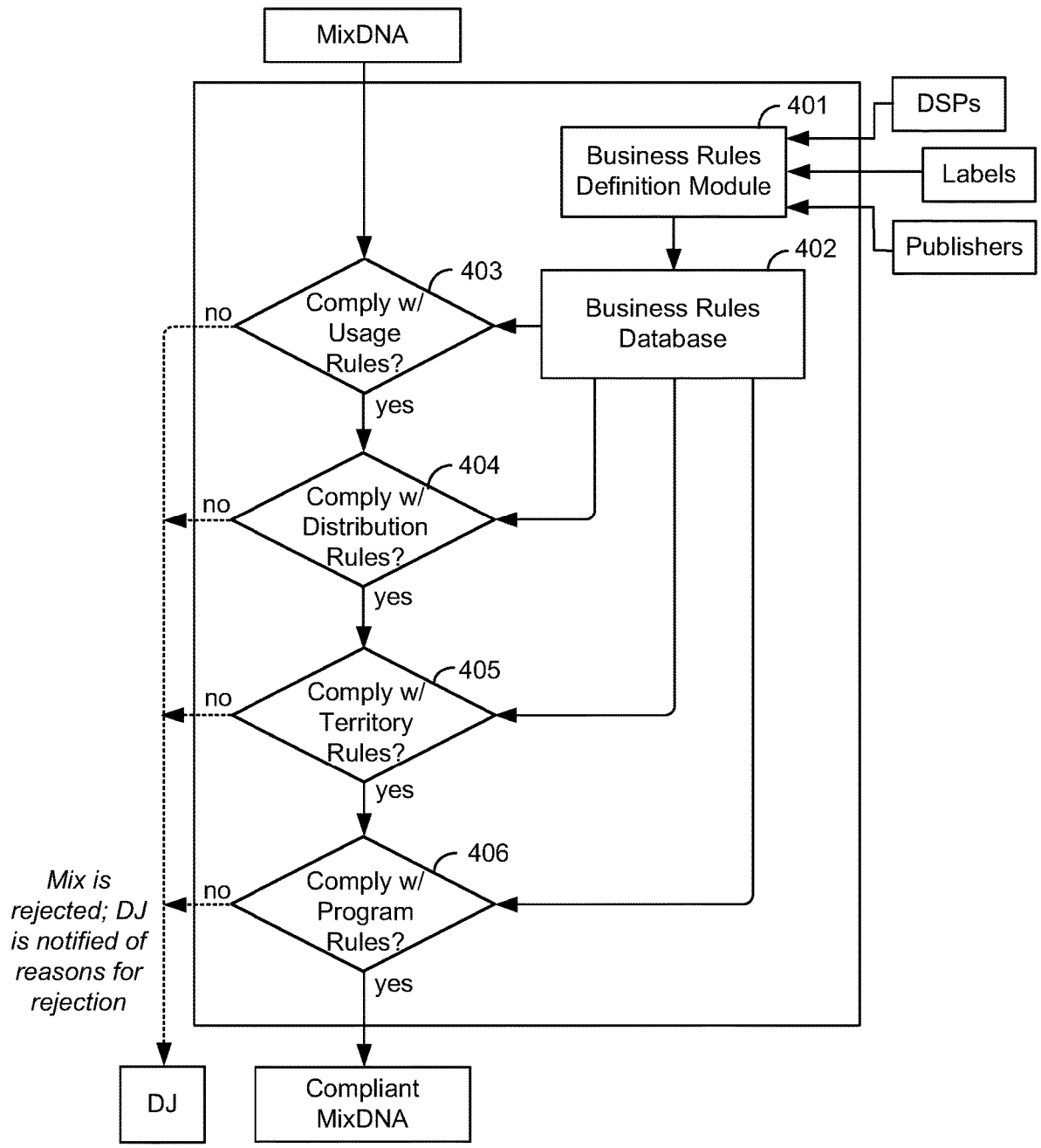
FIG. 9 illustrates an example method of identifying segments of media content in accordance with various embodiments.

There are numerous rights holders. Many have their own unique royalty reports that have to be provided, modified to include only royalty data associated with them. Some may receive a generic report but still limited to data they own. There are numerous PROs and collection societies all over the world. Each organization is sent their own royalty report, modified to include only royalty reporting associated with the country or countries represented by the organization FIG. 9 illustrates an example method of identifying segments in media content according to various embodiments. For example, in a business rules application process, a DJ mix or remix may pass in order for it to be compliant for distribution. Business Rules may include clearly defined sets of content restrictions and limitations defined by rights holders and DSP, that either apply to the music they own (i.e. labels, publishers) or the content that will be distributed through them (i.e. DSPs). The content restrictions and limitations ensure that a DJ mix is compliant At (401), a Business Rules Definition Module is an interface where members of DSPs, labels, and publishers can log in to define business rules. Rules may be defined by if-then conditions, for example, if condition X is satisfied, then Y may be performed. When business rules are changed or new business rules are defined, the media content processing system updates restrictions on any mix that was previously distributed to DSPs and can block the content if it no longer complies with the updated set of Business Rules. Restrictions and/or takedowns for previously distributed mixes and remixes are sent to DSPs to act on.

At (402)—The Business Rule Database is a collection of all the rules set by the rights holders for their catalogs and settings/preferences by DSPs for programs they offer and content they desire. When a track and/or a composition that has a rule is detected in the media content metadata, the rules are applied to the mix/remix. It is then considered non-compliant and cannot be distributed to the DSPs selected in the Content Distribution Module. It is also possible that non-compliance is limited to only specific territory, in which case the territory restriction is communicated to the DSP during distribution. Business rules are created automatically from label and publisher catalog feeds, during the ingestion, and can be augmented manually through label and publisher dashboards in the media content processing system. Business rules may include blacklisting artists, songs, albums, composers, compositions from use and distribution in mixes and remixes; territory controls to specify where content can or cannot be distributed; duration control for how much of the original master recording can be used in mixes or remixes; remix control for controlling how catalogs can or cannot be used in remixes; and many others.

At (403), Business Rules Validation may be performed against each mix media content metadata. If Business Rules affect one or more of the tracks in the mix, then the mix may be blocked from distribution. When a mix is blocked, a notification email is sent to the DJ with instructions on how to correct the mix and make it compliant for distribution. The DJ can then make those corrections and re-submit the edited mix. If there are no Business Rule that apply to any of the tracks in the mix, the mix is cleared for distribution and continues through the process. If there are any restrictions that apply to only some territories or subscription types or things that the DSP can control on their side while allowing the mix to be distributed in some other fashion, those restrictions are placed within the distribution metadata of the mix for each of the business rules and are communicated to the DSP at time of delivery.

According to various embodiments, some illustrative examples of rules are presented below:

Label X defines that DJs cannot use any music by Artist A.
If Artist A is detected within the mix, it is rejected.
Artist A has a rule that says DJs cannot use any tracks from their catalogue that are more then 3 years old.
Artist A has a rule that says DJs can only use tracks from their catalogue that were released in the last year.
Label A has a rule that says DJs cannot use tracks from any of their artists in a mix.

At (404)—Business Rules on Distribution are applied after mixes are cleared against rights holder defined business rules. DSPs can specify what genre type they desire, if they want DMCA compliant only or all mixes, mixes from most popular DJs or all or a mixture, etc. DSPs can set such preferences and only those mixes will be distributed to them. DJs can specify which DSPs mixes and remixes can be distributed to. Once the mix/remix is cleared, DJs specified distribution rules are applied. Rights holders can set DSP controls, restricting distribution of certain songs in their catalog to specific DSPs. Mixes/remixes with this content will be blocked from distribution to those DSPs.

At (405)—Business Rules on Territory are set by the rights holders. These are typically set based on rights to use in specific territories or to control rollout into specific territories. In such cases, mixes with territory rights restrictions are flagged and territory rights information for consumption is included along with the mix during distribution to a DSP.

At (406)—Business Rules on Programs are typically set by the DSP when they offer the rights holder the terms of a program and accepted or declined by the rights holder. For example, a DSP can offer a per stream royalty that some labels will accept and other will decline or an ad supported subscription model with lower royalties that some rights holders may not be interested in. Rights holders review all offered programs and accept or decline them. Each mix/remix that was cleared for distribution is checked to ensure that it includes content only from those rights holders that accepted the royalty terms for that DSP. The resulting output of the business rules application is a mix/remix whose tracklist contains content that is cleared for distribution and is referenced in FIG. 9 as Compliant media content metadata.

FIG. 10 illustrates an example method of identifying segments in media content according to various embodiments. FIG. 10 shows an overview of the media content processing Grading and Merging process that Candidate Matches returned by the fingerprinting service must pass through in order to accurately identify the underlying rights holders for each block within a mix.

According to various embodiments, Candidate Matches may be first placed through a cleaning process. At (501)—Cleaning is done for all 3 attributes found in the candidate matches—album title, artist name and track title, resulting in a cleaned and normalized version of each. Each of these attributes may contain certain specific keywords (phrases) that get removed in this step. In the 'Clean album titles' step, keywords such as 'compilation' and 'various artists' are removed. Should these keywords be enclosed in the brackets, those brackets are removed as well. In the 'Clean artist name' step, keywords listed below are removed from the track title field. Should these keywords be enclosed in the brackets, those brackets are removed as well. In the 'Clean track titles' step, keywords listed below are removed from the track title field. Should these keywords be enclosed in the brackets, those brackets are removed as well.

Examples of keywords that are removed are as follows: album mix, album version, amended lp version, clean, clean version, deluxe version, edit, explicit, feat, feat., featuring, ft., ftd., international version, karaoke, live, lp radio edit, main version, original, original mix, radio edit, re-mastered, remastered, remastered lp version, remix, rmx, single, tribute. The following are also removed from titles: disk N, disc N, mix, edit.

As a next step, the following common cleaning is performed, for example, including:
Removal of articles: the, an, a
Removal of special characters: '~!@#$%^ and*( )-_=+[ ] { };:'"|,<.>/?
Replacement of multiple successive space characters with a single one
Conversion of all characters to lower case At (502)—During the Grading step, grades are assigned to each cleaned candidate match. Should two cleaned attributes match but they don't reflect the exact same composition version, grading is used to determine which version will be used in the final tracklist. Overall grade is calculated by adding individual grades for album title, artist name and track title for every scan item. The highest overall grade for a particular scan item within an audio block will continue along the media content processing Grading and Merging Process. If two or more cleaned candidate matches receive the same grade, the candidate match with the highest degree of confidence, as returned by the fingerprinting service will be used. Artist name receives grade of −1, should the word 'tribute' be detected in the original name.

Grading for Track titles may include, for example:
i. 4 for rmx, remix, mix
ii. 3 for original
iii. 2 for radio edit
iv. 1 for instrumental
v. −1 for acoustic
vi. −2 for live The grading step produces sets of cleaned and graded candidate matches, which are processed through series of merging and purging steps. At (503)—First merging step is done using cleaned results and merging blocks together based on matching criteria, making longer blocks. In this processing stage only blocks that are successive are considered the same if there is a gap between them of no more than 120 seconds. Items are considered matching in two cases: 1) if their cleaned attributes match, or 2) if their cleaned artist name is 'various artists'. One of the matching criteria for Media content processing is to look at the duration returned by the fingerprinting service. Should Media content processing properly detect 2 sequential blocks with matching candidate matches, and should the fingerprint service return multiple candidate matches for the third, the correct candidate match will be selected from those results based on the duration. For example:
i. Block 1 (01:17:34-01:17:39): Track X (duration 00:06:34)
ii. Block 2 (01:17:40-01:17:46): Track X (duration 00:06:40)
iii. Block 3 (01:17:46-01:17:52): Track Y (duration 00:05:21) and Track X (duration 00:06:46)
iv. Even though Track Y was returned with a higher confidence and given a higher grade, the media content processing determines Track X should be used for Block 3 because the track durations match. Then the media content processing would merge these 3 blocks together.

At (504)—Next step is purging of the merged blocks whose duration is less than 7 seconds (minimal candidate match length), creating new empty blocks, with zero results. At (505)—Next is the second round of merging. The remaining non-empty blocks are merged together, again based on matching criteria, bridging the gap between those empty blocks introduced by purge step. The results from the above outlined merging and purging steps are then run through a series of phonetic, pattern-based fingerprinting algorithms. Each algorithm uses a different process that further merges scan items together.

At (506)—The phonetic fingerprint method is fast and simple yet works relatively well in a variety of contexts and it's the least likely to produce false positives. The process that generates the key from a string value is the following (note that the order of these operations is significant):
i. Remove leading and trailing whitespace
ii. Change all characters to their lowercase representation
iii. Remove all punctuation and control characters
iv. Split the string into whitespace-separated tokens
v. Sort the tokens and remove duplicates
vi. Join the tokens back together
vii. Normalize extended western characters to their ASCII representation (for example "gödel" "godel")

There are several factors that may play a role in this fingerprint:
Because whitespace is normalized, characters are lowercased, and punctuation is removed, those parts don't play a differentiation role in the fingerprint. Because these attributes of the string are the least significant in terms of meaning differentiation, these turn out to be the most varying parts of the strings and removing them has a substantial benefit in emerging clusters.
Because the string parts are sorted, the given order of tokens doesn't matter (so "Cruise, Tom" and "Tom Cruise" both end up with a fingerprint "cruise tom" and therefore end up in the same cluster)
Normalizing extended western characters plays the role of reproducing data entry mistakes performed when entering extended characters with an ASCII-only keyboard. Note that this procedure can also lead to false positives, for example "godel" and "godel" would both end up with "godel" as their fingerprint but they're likely to be different names, so this might work less effectively for datasets where extended characters play substantial differentiation role.

At (507)—The Levenshtein distance algorithm is a string metric for measuring the difference between two sequences. Informally, the Levenshtein distance between two words is the minimum number of single-character edits (i.e. insertions, deletions or substitutions) required to change one word into the other.

At (508)—The n-gram fingerprint method is similar to the phonetic fingerprint method described above but instead of using whitespace separated tokens, it uses n-grams, where the n (or the size in chars of the token) can be specified by the user.

For example, according to various embodiments, the following steps may be performed:
i. Change all characters to their lowercase representation
ii. Remove all punctuation, whitespace, and control characters
iii. Obtain all the string n-grams
iv. Sort the n-grams and remove duplicates
v. Join the sorted n-grams back together
vi. Normalize extended western characters to their ASCII representation
vii. For example, the 2-gram fingerprint of "Paris" is "arispari" and the 1-gram fingerprint is "aiprs".

This is a useful because using big values for n-grams doesn't yield any advantage over the previous fingerprint method, but using 2-grams and 1-grams, while yielding many false positives, can find clusters that other methods didn't find even with strings that have small differences, with a very small performance price. For example "Krzysztof", "Kryzysztof" and "Krzystof" have different lengths and different regular fingerprints, but share the same 1-gram fingerprint because they use the same letters.

At (509)—The Porter Stemming Algorithm is a process for removing the commoner morpholocial and inflexional endings from words in English. Stemming is the term used in linguistic morphology and information retrieval to describe the process for reducing inflected (or sometimes derived) words to their word stem, base or root form— generally a written word form. The stem needs not to be identical to the morphological root of the word; it is usually sufficient that related words map to the same stem, even if this stem is not in itself a valid root. In this particular step Media content processing treats words with the same stem as synonyms in a kind of query expansion, a process called conflation. The final result of the media content processing Grading and Merging Process is a set of Merged Scan Items.

FIG. 11 is an overview of the Textual Data Matching process that tracklist data supplied by the DJ passes through in order to match with copyright data, according to various embodiments. The process begins with lookups to the Music Catalog Database using the tracklist data. At (601)— Through a series of text lookups the track title and artist names contained within the tracklist data are matched against normalized metadata contained within the Music Catalog Database. If any of the tracks provided by the DJ did not have a match, they are used for another lookup via the Audio Fingerprinting Service. Any instances where matches were found, those parts of the tracklist data are removed from the remaining steps in the Textual Data Matching process and added to the Matched Copyright Data Sets at step (604).

At (602)—In order to get the ISRC for tracks that have not been matched yet, the track title and artist names are used for lookups to the Audio Fingerprinting Service. It should be noted that these lookups are text-based and independent of the original candidate matches returned by the Fingerprinting Audio Service in the beginning of the media content processing process (FIG. 6). However, results in either case come from the same database of acoustic and textual fingerprint data.

Figure 12:
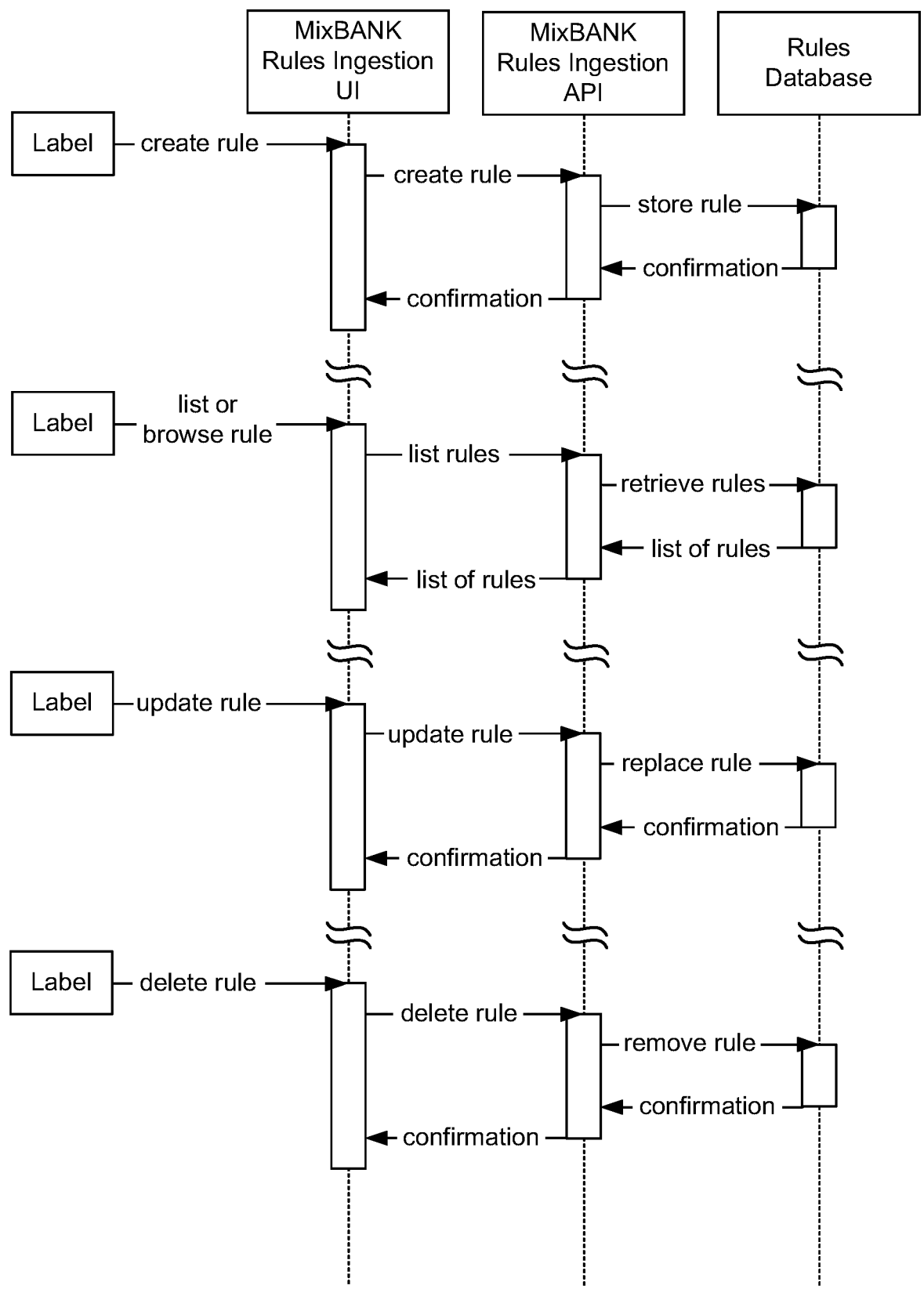
FIG. 12 illustrates an example method for identifying media content in accordance with various embodiments.

At (603)—If data matched via the Audio Fingerprinting Service text lookup does contain an ISRC, that identifier is used to retrieve normalized metadata from the Music Catalog Database. If data matched via the Audio Fingerprinting Service text lookup does not contain an ISRC, all the information is added to the Matched Copyright Data Sets. All sets of data identified during the Textual Data Matching process are merged, resulting in Matched Copyright Data Sets. These Matched Copyright Data Sets contain the following:
  Track title
  Artist name(s)
  Track start time
  Track stop time
  Total duration FIG. 12 illustrates an example method of determining asset rights associated with segments in media content according to various embodiments. The media content processing system may perform rule ingestion to create rules and apply the rules in order to determine what asset rights (e.g., copyrights, licensing rights: composition, recording, performance, etc.) are associated with the segments of media content. In some embodiments, the media content processing system may create and maintain its own centralized registry of media content and the associated rights holders. In other embodiments, the media content processing system may be operatively coupled to and in communication with an external entity having such a database of media content, for example, a governmental copyright database, an independently operated database or media content provider (e.g., publishers, labels, etc.).

As discussed above, the various embodiments may be implemented in a wide variety of operating environments, which in some cases may include one or more user computers, computing devices, or processing devices which may be used to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Various aspects also may be implemented as part of at least one service or Web service, such as may be part of a service-oriented architecture. Services such as Web services may communicate using any appropriate type of messaging, such as by using messages in extensible markup language (XML) format and exchanged using an appropriate protocol such as SOAP (derived from the "Simple Object Access Protocol"). Processes provided or executed by such services may be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network may be, for example, a local area network, a wide-area network, a virtual private network, the Internet, an intranet, an extranet, a public switched telephone network, an infrared network, a wireless network, and any combination thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C#or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be used to store the desired information and which may be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for processing media content, comprising:
   receiving a request with media content from a plurality of sources, the media content including at least audio information;
   scanning the media request;
   performing an audio fingerprinting of the media content to generate a set of audio fingerprints for the media content;
   identifying a plurality of segments from the media content based at least in part on the set of audio fingerprints corresponding to each segment matching data in a media content database;
   grading the plurality of segments;
   merging the plurality of segments;
   purging redundant segments from the plurality of segments to generate a remainder of segments;
   merging the remainder of the segments;
   applying a phonetic fingerprinting on the remainder of the segments to generate a set of phonetic fingerprints for each segment in the remainder of the segments;
   applying a Levenshtein distance algorithm on the set of phonetic fingerprints compared to data in the media content database to update the remainder of the segments as having a Levenshtein distance that satisfies a threshold distance;
   applying a N-gram fingerprinting on the remainder of the segments as having the Levenshtein distance satisfying the threshold distance to generate a set of N-gram fingerprints for each segment in the remainder of the segments;
   merging the set of N-gram fingerprints for each segment in the remainder of the segments;
   performing a textual lookup of each segment in the remainder of the segments to data in the media content database; and
   generating a list of asset information associated with each segment in the remainder of the segments based at least in part on the textual lookup.

2. The computer-implemented method of claim 1, wherein the list of asset information includes one or more rights holders associated with the segment, tracklist data associated with the segment, a publisher or label associated with the segment, licensing rights associated with the segment, or royalty payments associated with the segment.

3. The computer-implemented method of claim 1, further comprising:
   dividing the media content into segments based at least in part on a length of each segment.

4. The computer-implemented method of claim 1, further comprising:
   determining the list of asset information associated with each segment complies with one or more business rules.

5. The computer-implemented method of claim 4, wherein the one or more business rules includes usage rules, distribution rule, territory rules, or program rules.

6. The computer-implemented method of claim 1, wherein the purging redundant segments from the plurality of segments is based at least in part on purging segments from the plurality of segments that are below a predetermined duration.

7. The computer-implemented method of claim 1, wherein the applying the phonetic fingerprinting on the remainder of the segments comprises performing a plurality of text string normalizing steps in a predetermined order.

8. The computer-implemented method of claim 1, wherein the media content database includes normalized publisher supplied music related Intellectual Property right information, third-party information related to music, and editorial search information related to music.

9. A computer-implemented method for processing media content, comprising:
   receiving media content from a plurality of sources, the media content including audio information;
   performing an audio fingerprinting of the media content to generate a set of audio fingerprints for the media content;
   identifying, based at least in part on the set of audio fingerprints for the media content corresponding to matching data in a media content database, a plurality of segments from the media content;
   applying a phonetic fingerprinting on a set of the plurality of segments to generate a set of phonetic fingerprints for each segment of the set of the plurality of segments;
   processing, using the set of phonetic fingerprints, the set of the plurality of segments through at least one textual fingerprinting technique to determine a subset of segments matching a set of predetermined criteria; and generating a list of asset information associated with each segment in the subset of the segments based at least in part on a textual lookup of each segment in the subset of segments in the media content database.

10. The computer-implemented method of claim 9, wherein the list of asset information includes one or more rights holders associated with the segment, tracklist data associated with the segment, a publisher or label associated with the segment, licensing rights associated with the segment, or royalty payments associated with the segment.

11. The computer-implemented method of claim 9, further comprising:

dividing the media content into segments based at least in part on a length of each segment.

12. The computer-implemented method of claim 9, further comprising:

determining the list of asset information associated with each segment complies with one or more business rules.

13. The computer-implemented method of claim 12, wherein the one or more business rules includes usage rules, distribution rule, territory rules, or program rules.

14. The computer-implemented method of claim 9, wherein the set of predetermined criteria is based at least in part on a Levenshtein distance that satisfies a threshold distance.

15. The computer-implemented method of claim 9, wherein the processing the plurality of segments through at least one textual fingerprinting technique includes performing a plurality of text string normalizing steps in a predetermined order.

16. The computer-implemented method of claim 9, wherein the media content database includes normalized publisher supplied music related Intellectual Property right information, third-party information related to music, and editorial search information related to music.

17. A system, comprising:
at least one processor; and
memory storing instructions that, when executed by the at least one processor, cause the system to:
receive media content from a plurality of sources, the media content including audio information;
perform an audio fingerprinting of the media content to generate a set of audio fingerprints for the media content;
identify, based at least in part on the set of audio fingerprints for the media content corresponding to matching data in a media content database, a plurality of segments from the media content;
apply a phonetic fingerprinting on a set of the plurality of segments to generate a set of phonetic fingerprints for each segment of the set of the plurality of segments;
process, using the set of phonetic fingerprints, the set of the plurality of segments through at least one textual fingerprinting technique to determine a subset of segments matching a set of predetermined criteria; and
generate a list of asset information associated with each segment in the subset of the segments based at least in part on a textual lookup of each segment in the subset of segments in the media content database.

18. The system of claim 17, wherein the set of predetermined criteria is based at least in part on a Levenshtein distance that satisfies a threshold distance.

19. The system of claim 17, wherein the instructions that, when executed by the at least one processor, further cause the system to perform a plurality of text string normalizing steps in a predetermined order.

20. The system of claim 17, wherein the media content database includes normalized publisher supplied music related Intellectual Property right information, third-party information related to music, and editorial search information related to music.

* * * * *